United States Patent
Garner et al.

(10) Patent No.: US 12,484,465 B2
(45) Date of Patent: Dec. 2, 2025

(54) WING FLEX ASSEMBLIES FOR AGRICULTURAL IMPLEMENTS

(71) Applicant: DEERE & COMPANY, Moline, IL (US)

(72) Inventors: Elijah B. Garner, Bettendorf, IA (US); Dnyanesh K. Dhobale, Maharashtra (IN); Kamalakannan Natarajan, Pune (IN); Andrew W. Harmon, Geneseo, IL (US)

(73) Assignee: Deere & Company, Moline, IL (US)

( * ) Notice: Subject to any disclaimer, the term of this patent is extended or adjusted under 35 U.S.C. 154(b) by 498 days.

(21) Appl. No.: 17/962,826

(22) Filed: Oct. 10, 2022

(65) Prior Publication Data

US 2024/0114816 A1    Apr. 11, 2024

(51) Int. Cl.
*A01B 63/32*    (2006.01)
*A01B 63/24*    (2006.01)
*A01C 7/08*    (2006.01)

(52) U.S. Cl.
CPC .............. *A01B 63/32* (2013.01); *A01B 63/24* (2013.01); *A01B 63/245* (2013.01); *A01C 7/08* (2013.01)

(58) Field of Classification Search
CPC .......... A01B 63/32; A01B 63/24; A01B 63/25
See application file for complete search history.

(56) References Cited

U.S. PATENT DOCUMENTS

| | | | | |
|---|---|---|---|---|
| 4,589,802 A | * | 5/1986 | Hampton | E21B 41/08 405/227 |
| 4,896,730 A | * | 1/1990 | Jarrett | A01B 19/06 172/311 |
| 8,016,043 B2 | * | 9/2011 | Naylor | A01B 69/024 172/126 |

(Continued)

FOREIGN PATENT DOCUMENTS

| | | |
|---|---|---|
| DE | 102004020609 A1 | 12/2005 |
| EP | 0645075 B1 | 12/1999 |

(Continued)

OTHER PUBLICATIONS

Extended European Search Report and Written Opinion issued in European Patent Application No. 23201695.6, dated Mar. 1, 2024, in 06 pages.

*Primary Examiner* — Christopher J Sebesta
*Assistant Examiner* — Audrey L Lusk
(74) *Attorney, Agent, or Firm* — Taft Stettinius & Hollister LLP; Stephen F. Rost

(57) ABSTRACT

A wing flex assembly for a frame system of an agricultural implement that includes inner and outer tubes. The outer tube, to which tools of the implement are attached, is slidingly displaceable along the inner tube as the inner tube is downwardly pivotally displaced with a downward flex of a wing frame. A first tool of a center frame can be separated from an adjacent second tool of the wing frame that is attached to the outer tube by a first distance when the outer tube is at a retracted position, and a second distance when (Continued)

the outer tube is slidingly displaced in response to the downward pivotal displacement of the inner tube, the first distance being about equal to the second distance. The wing flex assembly can also prevent contact between the first and second tools when the inner tube is pivotally displaced in an upward direction.

20 Claims, 18 Drawing Sheets

(56) References Cited

U.S. PATENT DOCUMENTS

| | | | |
|---|---|---|---|
| 9,801,343 B2 * | 10/2017 | Markt | A01D 41/14 |
| 2017/0258000 A1 * | 9/2017 | Harnetiaux | A01B 63/008 |
| 2018/0220576 A1 * | 8/2018 | Blackwell | A01B 73/044 |
| 2020/0053951 A1 * | 2/2020 | Becker | F16C 11/045 |

FOREIGN PATENT DOCUMENTS

| | | |
|---|---|---|
| EP | 3254549 B1 | 3/2019 |
| WO | WO 2017/059259 A1 | 4/2017 |

* cited by examiner

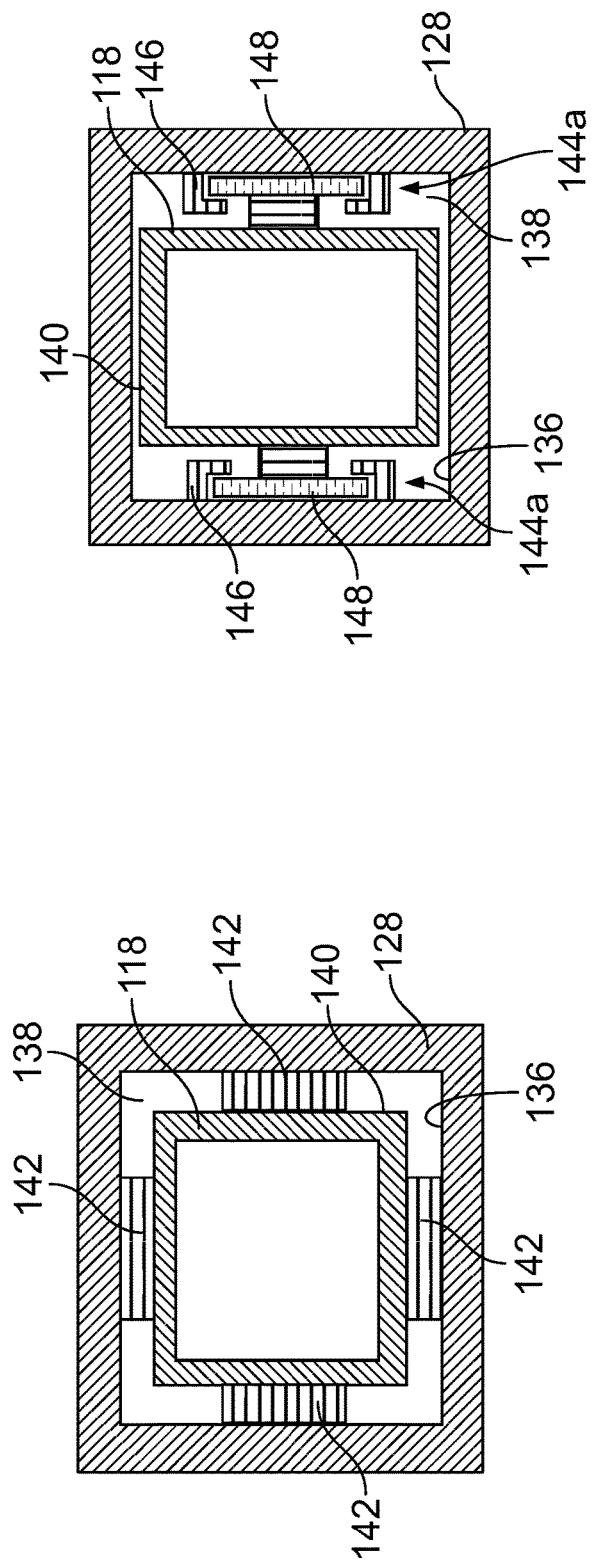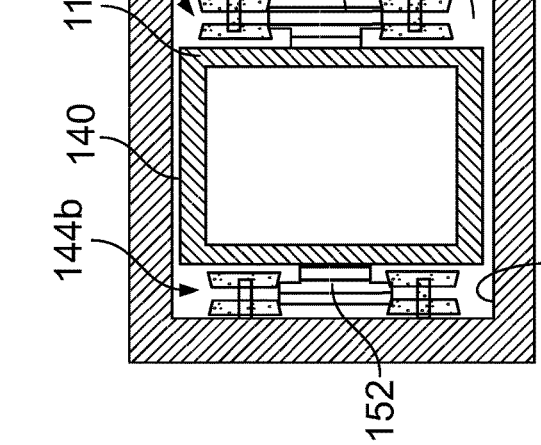
FIG. 5B
FIG. 5C
FIG. 5A

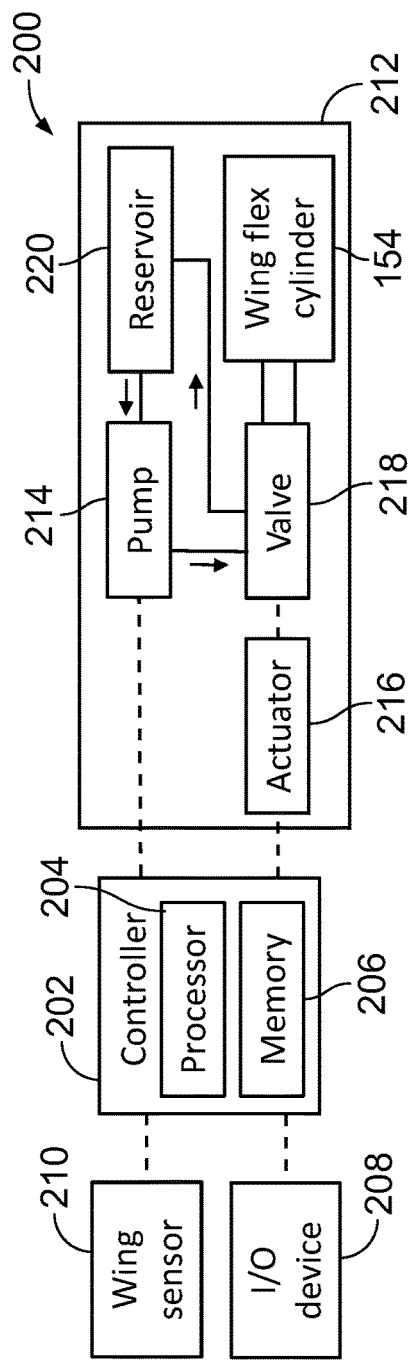
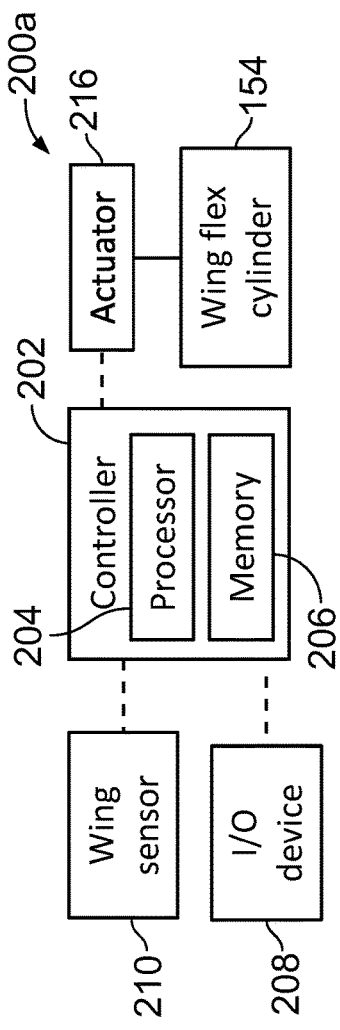
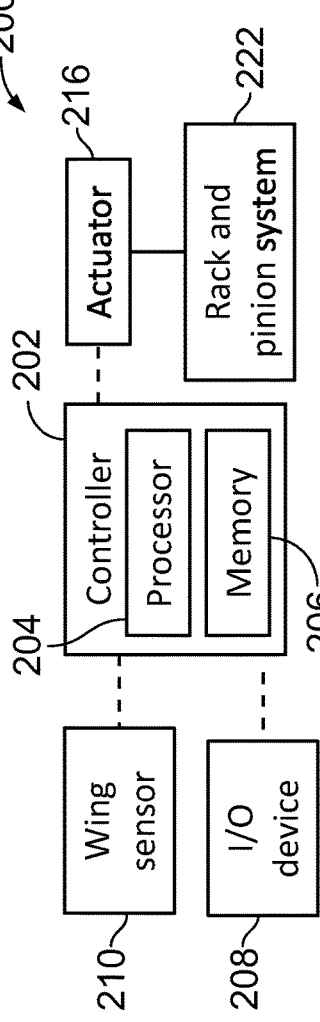
FIG. 7
FIG. 8A
FIG. 8B

WING FLEX ASSEMBLIES FOR AGRICULTURAL IMPLEMENTS

FIELD OF THE DISCLOSURE

The present disclosure generally relates to frame sections of agricultural implements, and, more specifically, to wing flex assemblies that can minimize crop row spacing variation, particularly during down flex of wing frames.

BACKGROUND

Certain agricultural implements, including, for example, planters and air-seeders, among others, are often divided into sections across the width of the implement. For example, with respect to planters that utilize row units that plant seed into soil, the planters are often divided into sections. Such sections can include a center frame and one or more other sections on opposing sides of the center frame, which are often referred to as wings or wing frames.

Agricultural implements such as planters often have a relatively wide width, and can thus extend across a relatively wide area of a field. During operation of such agricultural implements, the row units, or other tools of the implement, that are to contact a ground surface of the field can encounter a wide range of ground profiles, including variations in ground surface profiles across the relatively large width of the agricultural implements. Such variations in ground profiles can, at least at certain locations in a field, facilitate a lowering or raising, otherwise referred to as flex, of one or both of the wing frames relative to the central frame.

Attempts to accommodate upward and downward flexing of wing frames relative to the center frame can create issues with respect to the spacing of the row units or other tools that are attached to the wing frame that can adversely impact crop row spacing and/or create interference issues that can result in equipment failure. For example, with respect to at least certain types of systems that do accommodate wing frame flex, as the wing frame flexes, the distance between the last row unit of the center section and the adjacent first row unit on the flexing wing frame changes. Yet changes in the distance between these adjacent row units can cause undesirable deviations with respect to the spacing between the seeds being planted by these adjacent row units, and thus, deviations in the resulting crop row spacing. Such spacing issues can be particularly prevalent during down flex of the wing frame(s). Further, with respect to at least certain types of narrow row spacing equipment, such a decrease in the distance between the last row unit of the center frame and the adjacent first row unit of the wing can result in the two row units contacting each other before the wing frame can flex all the way to down in a manner that can both impact the spacing between the adjacent crop rows for those row units and interfere with other row units being positioned to plant seed to selected depths in the soil.

Accordingly, systems and/or methods to minimize row spacing variations and variations in seed plant depth that can be associated with wing frame flex remains an area of interest.

SUMMARY

The present disclosure may comprise one or more of the following features and combinations thereof.

In one embodiment of the present disclosure, a frame system of an agricultural implement can comprise a center frame that can be coupled to at least a first tool, a wing frame that can be coupled to at least a second tool, and a wing flex assembly. The wing flex assembly can include an inner tube and an outer tube, the inner tube being pivotally coupled to the center frame and adapted to be pivotally displaced in at least a downward direction relative to the center frame in response to a downward flex of the wing frame. The outer tube can be slidingly displaceable along the inner tube at least as the inner tube is pivotally displaced in the downward direction. Further, the second tool can be coupled to the outer tube and is laterally displaceable with the sliding displacement of the outer tube. Additionally, the first tool can be separated from the second tool by a first distance when the outer tube is at a retracted position along the inner tube, and a second distance when the outer tube is displaced to the extended position in response to a downward flex of the wing frame, the first distance being about equal to the second distance. The wing flex assembly can be further configured to prevent the second tool from physically contacting the first tool when the inner tube is pivotally displaced in an upward direction by an upward flex of the wing frame.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIGS. 5A-5C are cross sectional views of sliding systems for telescopic displacement of an outer tube about or along an inner tube for one or more of the wing flex assemblies discussed herein;

FIGS. 7-9 are diagrammatic views of control systems for controlling the operation of the wing flex assembly shown in FIG. 3;

Corresponding reference numerals are used to indicate corresponding parts throughout the several views.

DETAILED DESCRIPTION

Figure 1:
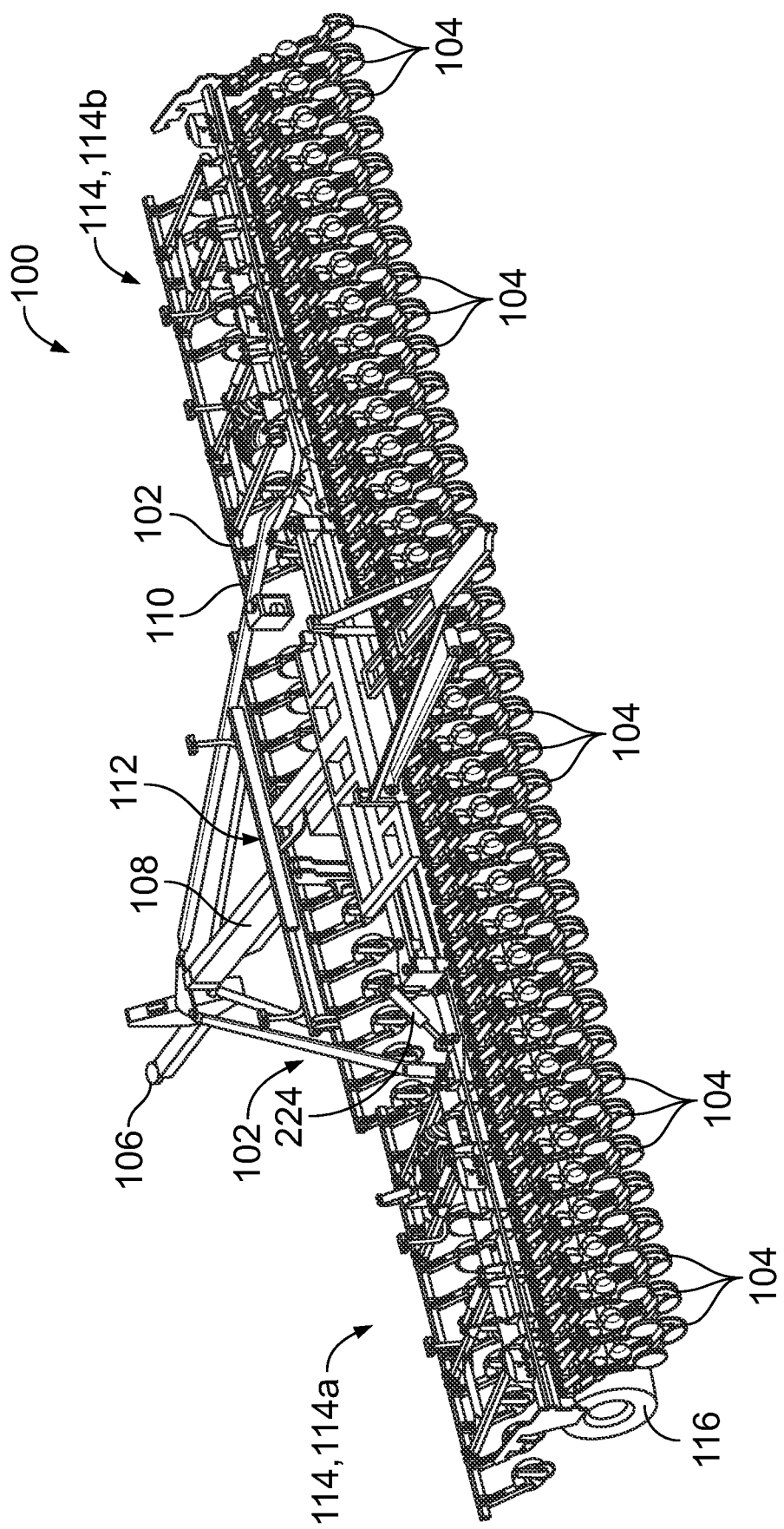
FIG. 1 is a perspective view of an agricultural implement in the form of a planter having a plurality of tools in the form of row units.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

FIG. 1 illustrates an agricultural implement 100 in the form of a planter that includes a first embodiment of a wing flex assembly 102. While the agricultural implement 100 is shown as a planter, embodiments disclosed herein can be applicable to a variety of other types of agricultural implements having multiple frame sections. In the illustrated embodiment, the agricultural implement 100 is designed to be coupled to a work machine or tractor (not shown) that can pull, push, and/or carry the agricultural implement 100. The agricultural implement 100 can be configured to perform an agricultural operation. Thus, for example, the agricultural implement 100 can include work tools, such as, for example, a plurality of row units 104, that can penetrate into soil for planting seed and/or for depositing fertilizer. The agricultural implement 100 can be attached to the work machine or tractor in a variety of manners, including by a hitch assembly 106, such as, for example, a three-point hitch or a drawbar attachment, among other manners of attachment. The hitch assembly 106 can include a hitch frame member 108 that extends longitudinally in a direction of travel.

The agricultural implement 100 can include a transversely-extending frame 110 that forms multiple frame sections. In FIG. 1, for example, the frame 110 includes a main or center frame 112 that is coupled to the hitch assembly 106, as shown. A first frame section or first wing frame 114*a* is disposed on one side of the center frame 112, and a second frame section or second wing frame 114*b* is disposed on a second, opposite side of the central frame 112. Although not shown, a one or more additional sections can also be disposed to an outside of the first wing frame 114*a*, and one or more other frame sections can be disposed to an outside of the second wing frame 114*b*.

Figure 2:
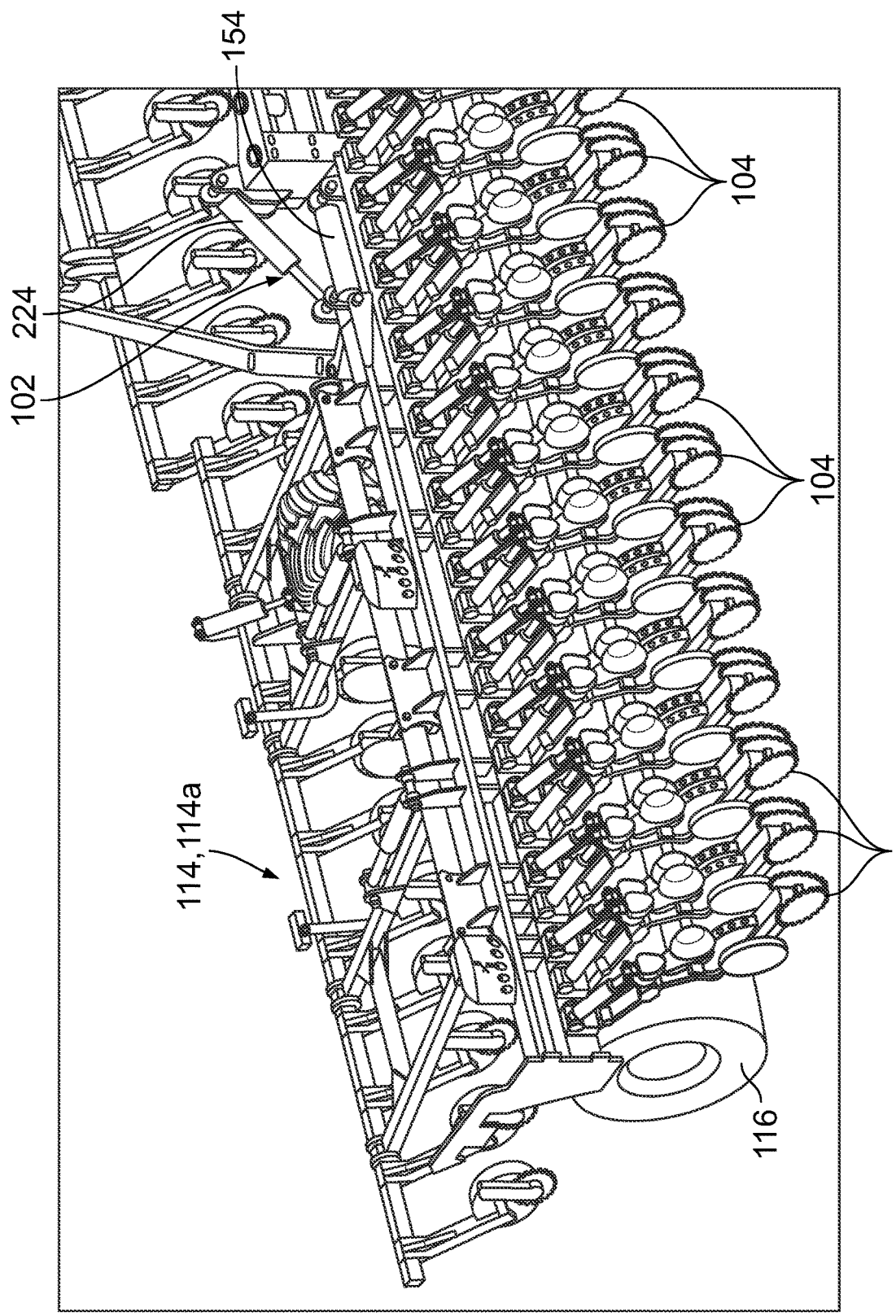
FIG. 2 is a perspective view of a portion of the agricultural implement shown in FIG. 1.
Figure 3:
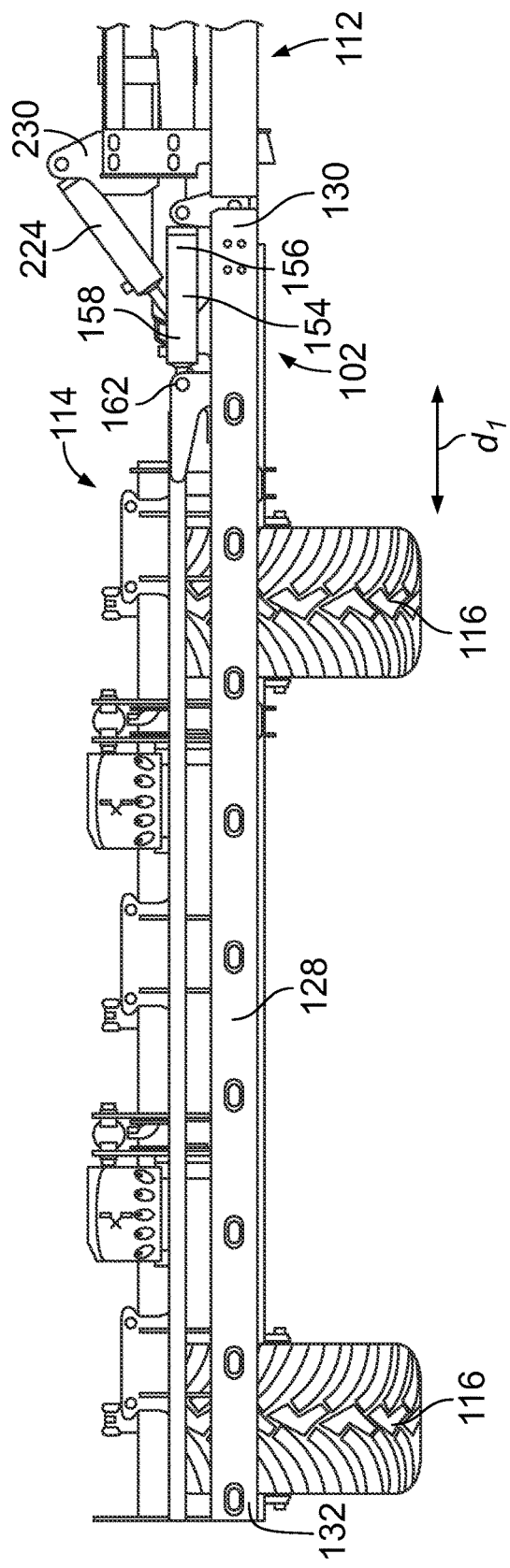
FIG. 3 is a partial rear view of a portion of the agricultural implement shown in FIG. 1 without the row units and having a wing flex assembly.

As seen in at least FIGS. 1-3, the implement 100 can be supported by a plurality of wheels 116. According to certain embodiments, each frame section 112, 114*a*, 114*b* of the frame 110 can be supported by a different pair of wheels 116, although it should be appreciated that other configurations can be employed. In some embodiments, for example, each frame section 112, 114*a*, 114*b* can be supported by a single wheel 116. Additionally, in some embodiments, each frame section 112, 114*a*, 114*b* can be supported by one or more wheels 116. Moreover, the implement 100 can include, for example, front wheels 116 disposed near the front of the implement 100, such as, for example, near the hitch assembly 106 and/or back wheels 116 disposed near the rear of the implement 100 for additional support, for example. According to certain embodiments, the wheels 116 can be attached to portions of the wing frame 114*a*, 114*b* that are not slidingly displaced with portions of the flex wing assembly 102 between extended and retracted positions, as discussed below in more detail. Alternatively, according to certain embodiments, one or more wheels 116 can be attached to, or otherwise positioned, to be slidingly displaced with portions of the flex wing assembly 102, as such as, for example, an outer tube 128 (FIG. 3) that can moved between extended and retracted positions, as also discussed below.

The illustrated implement 100 also includes a plurality of row units 104. According to certain embodiments, each row unit 104 can be substantially identically configured. Each row unit 104 is configured to deposit seeds of varying sizes in respective furrows in the soil for raising crops. In some embodiments, two or more of the row units 104 are configured to deposit seeds of different sizes. Typically, however, the size of the seeds being deposited is the same for each row unit. In other embodiments, seeds of different sizes may be deposited side by side in adjacent rows at different planting depths depending on the size of the seed.

According to certain embodiments, a plurality of seed bins (not shown) can be operatively connected to each of the row units 104, and are configured to hold seeds for planting. In other embodiments, a single seed bin is used to supply seeds to all row units 104. In operation, each seed bin can hold the same type of seeds or different types of seeds, which may be directed to each of the row units 104 as necessary. A tool bar 118 can extend, and is coupled, to each of the row units 104 to maintain a predetermined spacing between furrows.

The wing flex assembly 102 is further depicted in FIGS. 2-4 and 6A. According to certain embodiments, a wing flex assembly 102 can be provided for each wing frame 114a, 114b (collectively referred to herein as wing frame 114) that is adapted for inwardly and outwardly slideable displacement of at least a portion of the wing flex assembly 102 in connection with extending or retracting of the wing frame 114 relative to at least the center frame 112. Further, such slideable displacement of at least a portion of the wing flex assembly 102 can be in a direction that is generally toward and away from the center frame 112, and can be in a direction that is generally perpendicular to a forward direction of travel of the implement 100. Additionally, such slideable displacement can be in a manner that may generally maintain spacing between tools, such as, for example row units 104, that are directly or indirectly coupled to the wing flex assembly 102 relative to each other and/or relative to one or more tools, including row units 104, that may be attached to the center frame 112. Such sliding displacement can also provide a force against the row units 104 that can overcome a tendency of row units 104 to at least occasionally remain at a same location or trench that is being created by the row unit 104, and thereby promote at least lateral displacement of the row units 104 so as to maintain spacing between the row units 104 during flexing of the wing frame 114.

While embodiments discussed herein reference row units 104 that are coupled to the wing frame 114 being slidingly displaced during instances of upward and downward flex of the wing frame 114, other tools of the implement can also be similarly displaced. For example, in addition to row units 104 that are attached to embodiments of wing flex assemblies discussed herein being sliding displaced during flex of the wing frame 114, seed openers and fertilizer openers, among other tools, can also similarly be slidingly displaced. Further, these other tools that can also be mounted or attached to the wing flex assemblies can be slidingly displaced as the wing flex assembly moves between extended and retracted positions in manners that maintain a selected spacing between the tools.

Figure 10:
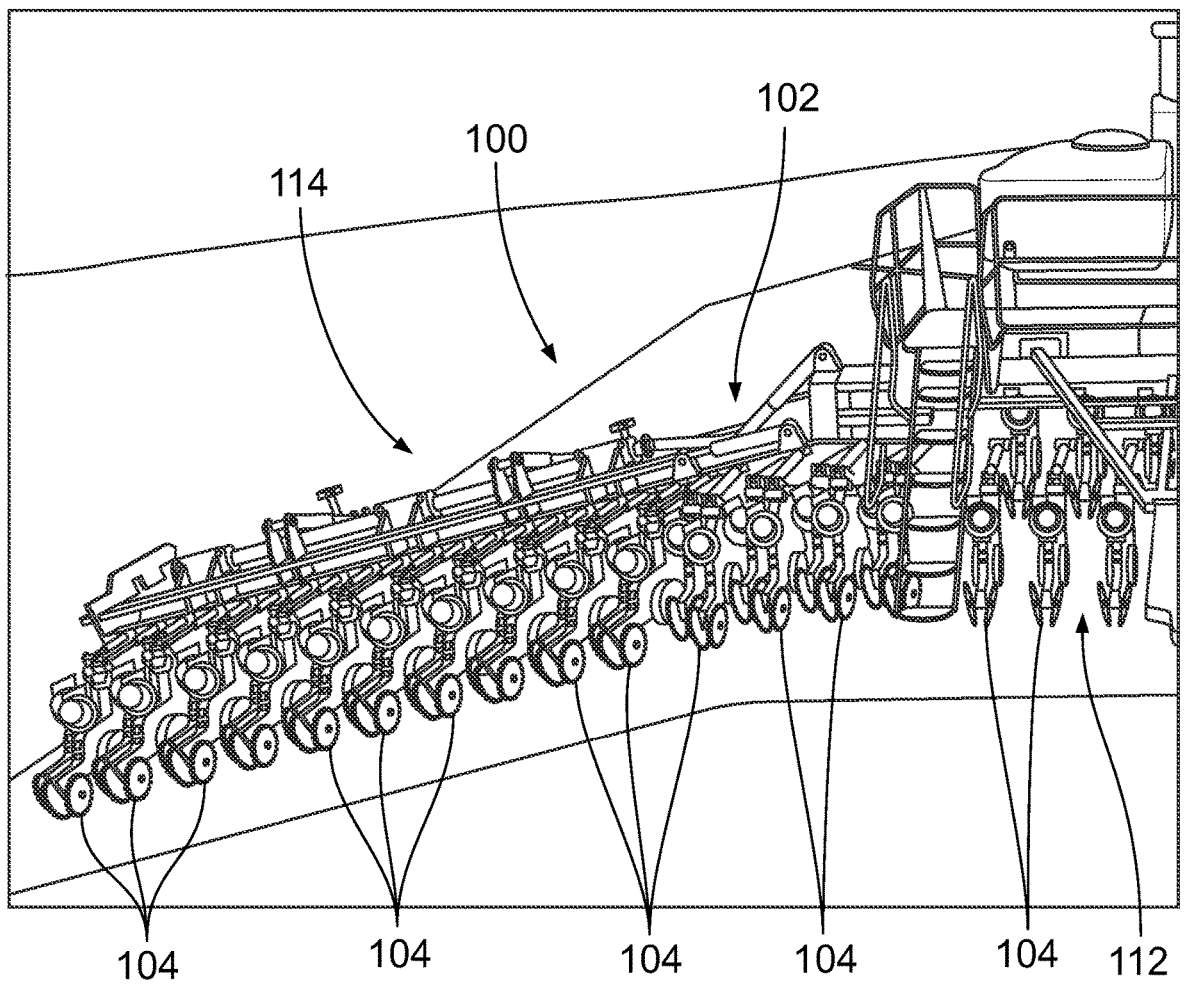
FIG. 10 is a rear view of a portion of the agricultural implement shown in FIG. 1 in which the wing frame and wing flex assembly are in downward flexed positions.

According to certain embodiments, the wing flex assembly 102 can include an inner tube 118 having a first end 120 and a second end 122. The inner tube 118 can be constructed from a variety of materials, including, but not limited to, steel, metal, and alloys, as well as combinations thereof, as well as other materials that may traditionally be used for frames of agricultural implements. The first end 120 of the inner tube 118 can be directly or indirectly pivotally coupled, such as, for example, via a pin 124, to the center frame 112 at a wing pivot point 126. Such a pivotal connect can accommodate at least the inner tube 118, and thus the wing frame 114, being pivoted or flexed, relative to the center frame 112 from a neutral position, as shown in at least FIGS. 2-5, to a generally downward flex position, as seen for example in FIG. 10. The pivotal connection between the inner tube 118 and the center frame 112 can also similarly accommodate the wing frame 114 being pivoted or flexed in a generally upward direction relative the center frame 112. According to certain embodiments, the wing flex assembly 102 can accommodate the wing frame 114 being pivoted or flexed about 15 degrees from the neutral position, or with respect to the ground, in the generally upwardly direction, and about 15 degrees from the neutral position, or with respect to the ground, in the generally downward direction.

The wing flex assembly 102 can also include an outer tube 128 that can be slidingly displaced along, or about, at least a portion of the inner tube 118. The outer tube 128 can have first and second ends 128, 130, and can provide at least a portion of the wing frame 114. Further, tools of the implement 100, such as, for example, row units 104 that are attached to the wing frame 114 can be coupled so that the row units 104 can be outwardly and inwardly displaced with the sliding displacement of the outer tube 128 as the outer tube 128 is slidingly displaced about or along the inner tube 118 between retracted and extended positions. Thus, for example, the outer tube 128 can include a variety of mounting brackets 134a, 134b that can be configured for direct coupling of tools and/or other components that are used for supporting and/or attachment of tools of the implement 100. For example, according to certain embodiments, outer tube 128 can provide and/or be attached to a tool bar to which the row units 104 can be directly or indirectly attached, such as, for example, via mechanical fasteners, including bolts, screws, and/or pins, and/or associated mounting brackets or coupling devices. Additionally, the outer tube 128 can be constructed of one more materials that are traditionally associated with frames of implements for agricultural implements, including, for example, metal, steel and alloys, as well as combinations thereof, among other materials.

The outer tube 128 can be constructed to be slidingly displaced along, about, and/or relative to the inner tube 118 in a variety of manners. For example, according to certain embodiments, at least a portion of the outer tube 128 can be configured for a telescopic arrangement with respect to least a portion of the inner tube 118. According to such embodiments, the inner and outer tubes 118, 128 can have configurations that can accommodate slideable displacement of the outer tube 128 relative to the inner tube 118 as the outer tube 128 is moved between the retracted and extended positions (in the general direction indicated "i" in FIG. 3) relative to at least the center frame 112. For example, according to certain embodiments, the outer tube 128 can have an inner wall 136 (FIG. 4) that generally defines an at least partially enclosed, or, alternatively, an entirely enclosed, interior area 138 of the outer tube 128. The interior area 138 can extend through or along at least the first end 130 of the outer tube 128 so as to accommodate placement of at least a portion of the outer tube 128 about the inner tube 118, including, but not limited to, at least a portion of the inner tube 118 being positioned within at least a portion of the interior area 138 of the outer tube 128. For example, according to the illustrated embodiment, at least the second end 122 of the inner tube 118, as well as a portion of the inner tube 118 between the first and second ends 120, 122 of the inner tube 118, can be sized for placement within the interior area 138 of the outer tube 128. Such a configuration can at least assist in guiding slideable lateral displacement of the outer tube 128 to, or toward, the extended position and away from the center frame 112, and/or toward the second end 122 of the inner tube 118, at least as the wing frame 114 is being downwardly flexed. The extent to which the inner tube 118 is positioned within the outer tube 128 can be based on a variety of criteria, including, for example, the weight of the outer tube 128, including the tools attached thereto, and/or the degree of flex that the wing flex assembly 102 may be configured to accommodate.

The sliding action of the outer tube 128 relative to the inner tube 118 can occur in a variety of manners, and/or via different types of interactions. For example, referencing FIG. 5A, according to certain embodiments, one or more sides of inner wall 136 of the outer tube 128, or one or more sides of the outer wall 140 of the inner tube 118 can be attached to one or more sliding, wear, and/or bearing pads 142. Such pads 142 can be constructed to provide a surface upon which the outer tube 128 can be slidingly displaced as the outer tube 128 moves between the extended or retracted positions, and without directly sliding against the outer wall 140 of the inner tube 118. Such surfaces of the pads 142 can have a degree of wear resistance, while also providing a relatively low degree of resistance to the slideable displacement of the outer tube 128.

Referencing FIGS. 5B and 5C, in addition, or as an alternative, to the pads 142 seen in FIG. 5A, according to certain embodiments various types of roller systems 144a, 144b can be utilized, including, for example, roller systems that utilize bearing and/or conveyor systems, as well as motorized and non-motorized roller systems 144a, 144b. For example, FIG. 5B illustrates a T-slider roller system 144a comprising one or more tracks 146 that is/are positioned on one of the inner or outer tubes 118, 128, and one or more rollers 148 that can be connected to the other of the inner and outer tubes 118, 128. Moreover, in the illustrated embodiment depicted in FIG. 5B, a track 146 in the form of a T-track is connected to an inner wall 136 of the outer tube 128, while a plurality of rollers 148 extend from the inner tube 118 to positions at which the rollers 148 can be rotated within the track 146 as the outer tube 128 is slidingly displaced between the extend and retracted positions. FIG. 5C illustrates another exemplary roller system 144b in the form of a roller coaster in which one or more beams or tracks 152 are mounted to one of the inner or outer tube 118, 128 is positioned between a plurality of rollers or wheels 116 that are connected to the other of the inner or outer tube 118, 128. In the illustrated example, a pair of rollers or wheels 148 are positioned on opposing sides of each beam or track 152 of the roller system 144b, and are rotated against the adjacent beam 152 as the outer tube 128 is displaced between extended and retracted positions.

According to certain embodiments, the wing flex assembly 102 also includes at least one first or wing flex cylinder 154 that can assist in providing a force that pushes and/or pulls the outer tube 128 as the outer tube 128 is slid to the extended and/or retracted positions. According to certain embodiments, the wing flex cylinder 154 can be a hydraulic or pneumatically activated cylinder. Alternatively, or additionally, the wing flex cylinder 154 can instead be an electrically activated actuator, including, for example, an actuator that utilizes a lead screw to push and/or pull the outer tube 122 between extended and/or retracted positions. According to embodiments in which the wing flex cylinder 154 is a double acting cylinder, fluid can be delivered to a first end 156 of the cylinder 154, and removed from a second end 158 of the cylinder 154 when the cylinder 154 is being extended, and delivered to the second end 158 of the cylinder 154 and removed from the first end 156 of the cylinder 154 when the cylinder 154 is being retracted. Additionally, according to certain embodiments, the wing flex cylinder 154 can be part of an open looped or closed looped hydraulic system. Additionally, according to certain embodiments, the wing flex cylinder 154 can be part of a hydraulic system that is dedicated to the operation of the wing flex cylinder 154, and, moreover, to the raising or lowering of the wing frame(s) 114. Alternatively, the wing flex cylinder 154 can be part of an overall hydraulic system of the implement 100 and/or the associated agricultural machine, such as, for example, tractor, that is not dedicated solely to the movement of the wing frame(s) 114.

Figure 4:
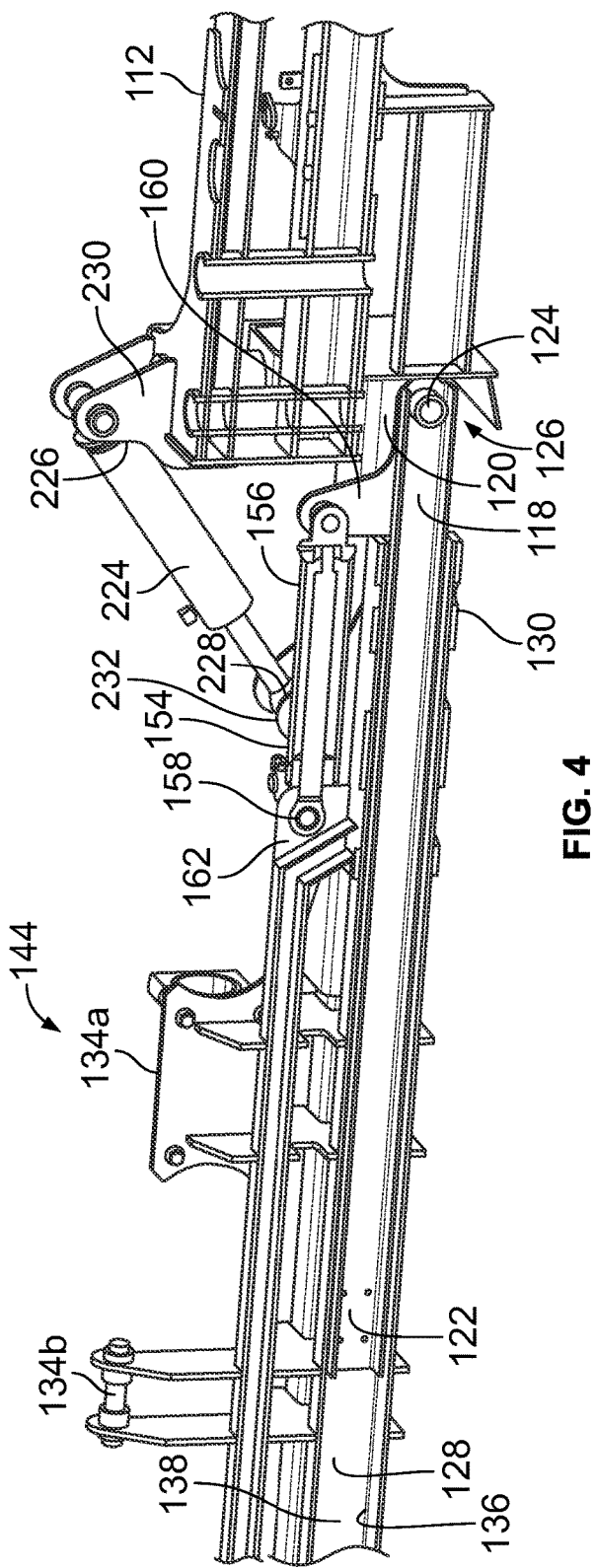
FIG. 4 is a cross sectional perspective view of the wing flex assembly shown in FIG. 3.
Figure 6A:
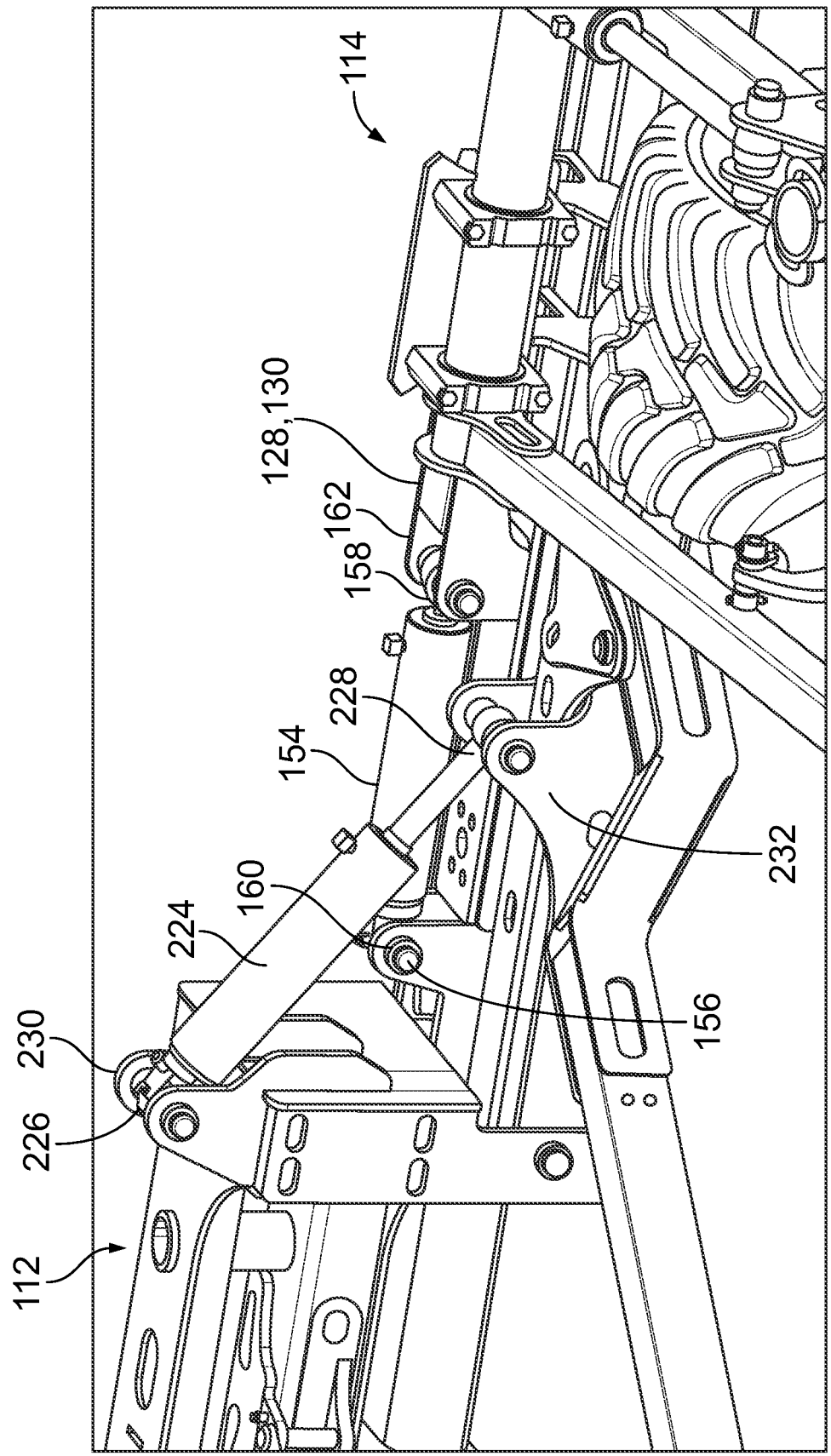
FIG. 6A is a perspective view of the wing flex assembly shown in FIG. 3.

As seen in at least FIGS. 3, 4, and 6A, a first end 156 of the wing flex cylinder 154 can be pivotally coupled to the inner tube 118. For example, according to certain embodiments, the inner tube 118 can include an inner tube flange 160 that is positioned at or around the first end 120 of the inner tube 118, and outwardly projects from the inner tube 118. Moreover, the inner tube flange 160 can outwardly extend, such as, for example, in an upward direction, to a distance or height that can prevent the outer tube 128 from sliding over and/or beyond the inner tube flange 160. Alternatively, according to other embodiments, the first end 156 of the wing flex cylinder 154 can be pivotally coupled to the pin 124, and may, or may not, be at least partially enclosed within the inner tube 118. Further, according to certain embodiments, the inner tube flange 160 and/or the wing flex cylinder 154 can provide a stopper that can limit the extent the outer tube 128 can be moved to the retracted position. Moreover, the inner tube flange 160 and/or wing flex cylinder 154 may, or may not, be positioned to generally define, and/or otherwise be located at a position that corresponds to, the position of the first end 130 of the outer tube 128 when the outer tube 128 is at, or has reached, the retracted position.

A second end 158 of the wing flex cylinder 154 can be pivotally coupled to an outer tube flange 162. As seen in at least FIG. 4, according to certain embodiments, the outer tube flange 162 can be generally offset from the first end 130 of the outer tube 128 so as to accommodate the length of the wing flex cylinder 154 from the location of the inner tube flange 160 at least when the wing flex cylinder 154 is generally at a retracted state. Alternatively, the second end 158 of the wing flex cylinder 154, among other portions, if not all, of the wing flex cylinder 154 can be housed within the outer tube 128. As discussed below in more detail, actuation of the wing flex cylinder 154 such that the wing flex cylinder 154 is displaced between fully extended and fully retracted positions, as well as positions therebetween, can occur in a variety of different manners.

According to certain embodiments, the fully extended position of the outer tube 128 relative to at least the inner tube 118 can correspond to the wing flex cylinder 154 being at, or actuated to, a fully extended state or position, and the fully retracted position of the outer tube 128 relative to at least the inner tube 118 can correspond to the wing flex cylinder 154 being at, or actuated to, a fully retracted position. Alternatively, according to other embodiments, the center frame 114 and/or wing flex assembly 102 can provide mechanical limitations, or other structural features, that can limit the extent or distance the outer tube 128 can be inwardly and/or outwardly displaced, thereby defining the fully retracted and/or fully extended positions, respectively, of the outer tube 128.

FIG. 7 is a diagrammatic view of a control system 200 for controlling the sliding displacement of the outer tube 128. According to an illustrated embodiment, the control system 200 can include one or more computing devices, such as, for example, one or more controllers 202. The controllers 202 of the control system 200 can be configured to execute various control and/or computational functions associated with at least the sliding displacement of the outer tube 128, and can also be utilized in association with the operation of the associated agricultural vehicle and/or agricultural implement 100. As such, the controllers 202 can be communicatively coupled to various actuators, sensors, and other devices within, or remote from, the agricultural machine.

In some embodiments, each controller 202 can include one or more processors 204. Each processor 204 can be embodied as any type of processor or other compute circuit capable of performing various tasks such as compute functions and/or controlling the functions of at least the wing flex assembly 102, among other functions of the associated agricultural machine and/or implement 100, for example, the type or intended functionality of the associated agricultural implement. In some embodiments, each processor 204 can be embodied as a single or multi-core processor, a microcontroller, or other processing/controlling circuit. Additionally, in some embodiments, each processor 204 can be embodied as, include, or be coupled to an FPGA, an application specific integrated circuit (ASIC), reconfigurable hardware or hardware circuitry, or other specialized hardware to facilitate performance of the functions described herein. In some embodiments still, each processor 204 can be embodied as a high-power processor, an accelerator co-processor, an FPGA, or a storage controller.

In some embodiments, each controller 202 can include one or more memory devices 206. Each memory device 206 can be embodied as any type of volatile (e.g., dynamic random access memory (DRAM), etc.) or non-volatile memory capable of storing data therein. Volatile memory can be embodied as a storage medium that requires power to maintain the state of data stored by the medium. Non-limiting examples of volatile memory can include various types of random access memory (RAM), such as dynamic random access memory (DRAM) or static random access memory (SRAM). In some embodiments, each memory device 206 can be embodied as a block addressable memory, such as those based on NAND or NOR technologies. Each memory device 206 can also include future generation nonvolatile devices or other byte addressable write-in-place nonvolatile memory devices. Additionally, in some embodiments, each memory device 206 can be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 206 can refer to the device itself and/or to a packaged memory product. In some embodiments still, 3D crosspoint memory can comprise a transistor-less stackable cross point architecture in which memory cells sit at the intersection of word lines and bit lines and are individually addressable and in which bit storage is based on a change in bulk resistance. In some embodiments yet still, all or a portion of each memory device 206 can be integrated into the processor(s) 204. Regardless, each memory device 206 can store various software and data used during operation such as task request data, kernel map data, telemetry data, applications, programs, libraries, and drivers.

The control system 200 can include one or more input/output devices 208, such as, for example, joysticks, keypads, levers, touch screens, switches, knobs, a steering wheel, pedals, and the like. Such controls can include setting the agricultural implement 100 in a transport mode, which may be used, for example, when the implement 100 is being transported or is traveling to a location to perform an agricultural mode, and a plant mode, during which the tools of the implement will be performing an agricultural operation, such as, for example, the row units 104 planting a seed and/or depositing a fertilizer in a field. According to certain embodiments, the wing flex assembly 102 may be in an activated state or condition when the implement 100 is in the plant mode, and in a deactivated state or condition when the implement 100 is in the transport mode. According to certain embodiments, at least some of the I/O devices 208 can be located in an operator's cab of the agricultural machine.

According to certain embodiments, the control system 200 can also include one or more sensors 210 that can provide an indication of a position and/or orientation of at least the wing frame 114. According to certain embodiments, the sensor 210 is an angular and/or linear position sensor 210 that can detect an angular and/or linear positon change relative to a reference position. Examples of such sensors include, but are not limited to, Hall Effect sensors, eddy current sensors, inductive sensors, magneto-resistive sensors, and/or resistive sensors, among others. According to certain embodiments, information obtained via use of the sensor(s) 210, such as, for example, information indicating the current position and/or angular orientation of the wing frame 114, or portions thereof, including the wing flex assembly 102, relative to one or more reference locations, such as, for example, a reference at or on the center frame 112, can be communicated to the controller 202. The controller 202 can utilize such information to detect if the current positon and/or orientation of the wing frame 114, and/or whether a change in the positon and/or orientation of the wing frame 114, satisfies one or more predetermined thresholds. The predetermined thresholds can, for example, relate to the degree or extent that the wing frame 114 is, or is not, flexed in either an upward or downward direction relative to the center frame 112. In the event the predetermined threshold is or is not satisfied, the controller 202 can take actions to facilitate the wing flex assembly 102 being activated in a manner that facilitates the displacement of one or more components of the wing flex assembly 102, including for example, the outer tube 128 and the row units 104 and other tools that are attached thereto. For example, according to certain embodiments, satisfaction of a first predetermined threshold can provide an indication to the controller 202 that the outer tube 128 is to be displaced to an extended position and/or a position between the extended and retracted positions. Conversely, if the first predetermined threshold is not satisfied, or, alternatively, satisfaction of a second, different threshold, can provide an indication to the controller 202 that the outer tube 128, if at least partially extended, is to be displaced toward, or to, the retracted position.

Additionally, the extent or degree to which the predetermine threshold(s) are, or are not, satisfied, can also provide an indication to the controller 202 of the extent to which the outer tube 128 is to be displaced. Moreover, the controller 202 can be adapted to determine, based on the degree or extent that the wing frame 114 is either downwardly or upwardly flexed, the extent or distance the outer tube 128 is to be displaced along the inner tube 118. Such a determination can be based at least in part on maintaining a distance at which a tool on the center frame 112 and an adjacent or neighboring tool on the wing frame 114 are to perform agricultural operations in the field.

Thus, in the illustrated example in which the tools include row units 104, the row units 104 may at least initially be positioned at a selected set distance or spacing apart from each other so that a particular crop row spacing can be achieved. However, during operation of the implement 100, in the event the wing frame 114 is flexed, the controller 202 can, based on the selected set distance and the determined degree or extent of flex of the wing frame 114, determine the extent that the outer tube 128, and thus the row units 104 that are coupled to that outer tube 128, is to be displaced, so as to maintain the desired spacing between at least the neighboring row units of the central and wing frames 112, 114. Accordingly, as the degree of flex increases or becomes steeper, the controller 202 can, according to certain embodiments, increase the distance that the outer tube 128 is to be displaced toward the extended position so as to continue maintaining the select spacing between the neighboring row units 104.

Conversely, as the degree or extend of flex of the wing frame 114 decreases, the controller 202 can inwardly displace the outer tube 128 toward, or in the direction of, the retracted position of the outer tube 128. Further, in the event the degree or extent of flex of the wing frame 114 decreases to a level that does not satisfy a predetermined threshold, the controller 202 can generate commands or signals to inwardly displace the outer tube 128 to the retracted position. In such a situation, the outer tube 128 can be generally maintained at the retracted position until the sensor 210 again detects a flex of the wing frame 114 is, or will be, exceeding a threshold level.

According to certain embodiments, the one or more sensors 210 can also include a sensor, such as, for example, a linear sensor, that can indicate a current linear position of the outer tube 128, and/or the position of the outer tube 128 relative to the inner tube 118. Such information can indicate whether the outer tube 128 currently is at a fully retracted position, a fully extended position, and/or at a position therebetween. Moreover, such positional information can assist in determining when, and to the extent, the outer tube 128 is to be displaced. Additionally, information regarding the location of the outer tube 128 can indicate to the controller 202 when displacement of the outer tube 128 is to cease, such as, for example, when the outer tube 128 has reached a selected location which, as discussed above, can be at least partially based on the extent or degree to which the wing frame 114 is being deflected.

In response to detection of flexing of the wing frame 114, the wing flex cylinder 154 can be activated in a variety of different manners so as to displace the outer tube 128 toward, or to, one of the extended and the retracted positions. For example, according to the embodiment depicted in FIG. 7, the control system 200 can include a hydraulic system 212 having a pump 214, an actuator 216, a valve 218, and a fluid source or reservoir 220. While the actuator 216 in the illustrated embodiment is depicted as being separate from the valve 218, according to certain embodiments, the actuator 216 can be part of the valve 218, and vice versa. As discussed above, according to certain embodiments, the hydraulic system 212 can be part of an overall hydraulic system of the agricultural implement 100 and/or agricultural machine, or, alternatively, can be dedicated to the wing flex assembly 102. Further, the hydraulic system 212 can be an open looped or closed looped hydraulic system.

A variety of different types of valves can be utilized for the valve 218 of the hydraulic system 212, including, but not limited to, a sliding spool valve, a rotary spool valve, and a poppet valve, among others. The actuator 216 can be configured to operate the valve 218, and, more specifically, move the valve 218 between open and closed positions so to control the flow of fluid, such as, for example, oil, among other hydraulic fluids, through the valve 218 and to/from the wing flex cylinder 154. With respect to use with at least certain types of wing flex cylinders 154, a valve 218 in the form of a spool valve can be displaced to an open position at which fluid is delivered to the first end 156 of the cylinder 154, and removed from the second end 158 of the cylinder 154, such as, for example, when the wing flex cylinder 154 is being extended. Similarly, such a spool valve can be displaced to another open position at which fluid is delivered to the second end 158 of the cylinder 154, and removed from the first end 156 of the cylinder 154, such as, for example, when the wing flex cylinder 154 is being retracted.

Thus, with respect to the particular embodiment shown in FIG. 7, in the event the controller 202 determines from information provided by the sensor 210 that a downward flex of the wing frame 114 has exceeded, or is continuing to exceed, a predetermined threshold, the controller 202 can issue a signal to the actuator 216 indicating that the valve 218 is to be opened so that the wing flex cylinder 154 can be extended. According to certain embodiments, and/or in certain situations, the controller 202 can also issue a command to operate the pump 214 such that fluid is delivered through the opened valve 218 and to an end of the wing flex cylinder 154. AAs discussed below, according to certain types of wing flex cylinders 154, the supply of fluid to one end of the cylinder 154 can coincide with fluid passing out from another cylinder, or vice versa, of the implement 100 or the wing flex assembly 102.

According to certain embodiments, the extension of the wing flex cylinder 154 can cause the wing flex cylinder 154 to provide a force at and/or against the outer tube flange 162 that can outwardly and linearly displace the outer tube 128 along the inner tube 118 in a direction that is generally away from the center frame 112, as generally indicated by "d 1" in FIG. 3. Again, the extent to which the controller 202 retains the valve 218 in such an open position, and/or activates the pump 214, and thus the extent to which the wing flex cylinder 154 is to be extended, can depend on a variety of different criteria, including, for example, the extent that the wing frame 114 is being downwardly flexed and/or the initial position of the outer tube 128 relative to the inner tube 118 at the time when wing flex cylinder 154 is being activated.

Upon the outer tube 128 being displaced to a predetermined location along the inner tube 118, and/or displaced a selected distance, the controller 202 can, according to certain embodiments, generate a signal for the actuator 216 to close the valve 218, and/or to deactivate the pump 214. Such closing of the valve 218 can assist in generally maintaining the outer tube 128 at the selected extended position relative to the inner tube 118. The controller 202 can however generally regularly or consistently monitor information provided from the one or more sensors 210 that may indicate a change in the orientation or angle of the wing frame 114 relative to the center frame 112. For example, information received from the one or more sensors 210 can indicate a change in the extent or degree to which the wing frame 114 is being downwardly flexed, if at all. If the change indicates that the degree or extent of flex of the wing frame 114 is increasing, the controller 202 can again issue a command to actuate the actuator 216 to open the valve 218 so as to further extend the wing flex cylinder 154. Conversely, if the flexing of the wing frame 114 is decreasing, and/or has fallen below a predetermined threshold, as determined by the controller 202 using information from the sensor 210, the controller 202 can generate a command for the actuator 216 to position the valve 218 such that the flex wing cylinder 154 moves toward the retracted position, and/or is fully retracted. Such retraction of the wing flex cylinder 154 can result in the wing flex cylinder 154 generally exerting a pulling force on the outer tube 128 that inwardly displaces the outer tube towards, and/or to, the fully retracted position. Again, the extent the controller 202 has the wing flex cylinder 154 retracted, and thus the extent the outer tube 128 is inwardly displaced, can be based, at least in part, in maintaining a selected distance between the neighboring row units 104 of the center and wing frame and/or maintaining a distance between the location at which the neighboring row units plant seed.

While the foregoing example is discussed in terms of downward flexing of a wing frame 114, a similar approach also applies with respect to upward flexing of the wing frame 114. However, during upward flex, the extent the outer tube 128 can move into proximity to the center frame 112, and moreover, the extent that the first row unit 104 on the wing frame 114 can be moved into proximity with the neighboring row unit 104 on the center frame 112 can be limited. Such limitation on the displacement of the outer tube 128 can be configured to prevent physical contact at least between those two neighboring row units 104, and or to prevent at least those neighboring row units 104 from interfering with the operation of each other.

FIGS. 8A and 8B illustrate variations of the control system 200a, 200b in which the wing flex cylinder 154 is not a hydraulic or pneumatic cylinder, and moreover, the wing flex cylinder 154 does not utilize fluid to facilitate displacement of the cylinder 154 from the extracted and retracted positions. For example, referencing FIG. 8B, according to certain embodiments, the wing flex cylinder 154 can be an electromechanical cylinder, a mechanical cylinder, mechanical actuator, and/or a linear actuator. Additionally, as seen in FIG. 8B, according to certain embodiments, the wing flex cylinder 154 may instead be a rack and pinion and/or a lead screw system that can utilize an actuator 216 in the form of an electric motor to provide a driving force for rotation of the pinion. In such embodiments of the control system 200a, 200b, the controller 202 can issue commands to operate the actuator 216, such as, for example, commands to a linear actuator or an electric motor indicating a direction of rotation of a rotor of the motor, which can facilitate the inward or outward displacement of the outer tube 128. The controller 202 can further determine the duration of time of operation of the actuator or motor, and/or amount and/or degree of displacement that is to be provided by, the actuator 216 in connection with a determination of the distance to which the outer tube 128 is to be displaced toward either the extended or retracted position of the outer tube 128. Alternatively, the controller 202 can generate commands to displace the outer tube 128 via actuation of the actuator 216 until information provided by a position sensor of the one or more sensors 210 indicates the outer tube 128 has been linearly displaced to, or is reaching, a selected position. Such a determination of a location of the outer tube 128 can be achieved in manners similar to those discussed above with respect to the control system 200 of FIG. 7. Further, as with FIG. 7, although FIGS. 8A and 8B depict the actuator 216 and wing flex cylinder 154/rack and pinion system 222, being separate components, according to certain embodiments, the actuator 216 is part of the wing flex cylinder 154/rack and pinion system 222, or vice versa.

As illustrated in at least FIGS. 3, 4, and 6A, embodiments throughout this disclosure can include at least one second cylinder 224 that can at least assist in distributing the weight placed on the center frame 112. Such a second cylinder 224 can at least assist in the distribution of weight and forces associated with the downward of upward flexing of the wing frame 114. Additionally, or alternatively, the second cylinder 224 can be a down force cylinder that is utilized to provide a downward force on at least the wing frame 114 that can be translated to the row units 104, and thus utilized in attaining selected planting depths for the seeds that are planted by the row units 104. The second cylinder 224 can be part of the hydraulic system of the agricultural implement 100 and/or agricultural machine. Alternatively, the second cylinder 224 can be part of a hydraulic system that is dedicated to the operation of the second cylinder 224 and/or part of a hydraulic system dedicated to the operation of the second cylinder 224 and the wing flex assembly 102.

Figure 6B:
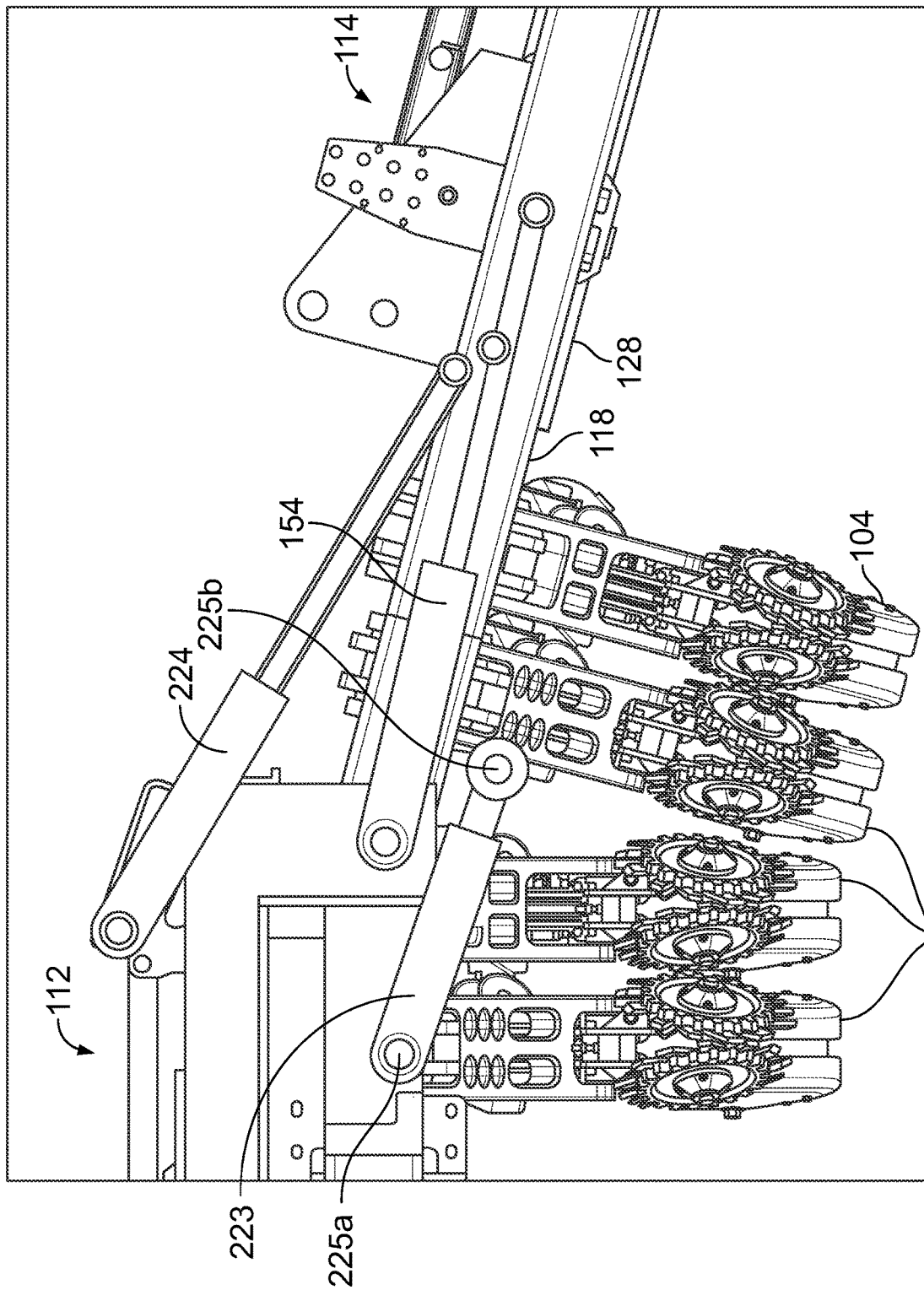
FIG. 6B is a rear view of a portion of the agricultural implement shown in FIG. 1 in which a plurality of cylinders that in a master-slave arrangement are utilized in the displacement of an outer tube of the wing flex assembly.

Further, according to certain embodiments, the second cylinder 224 can be part of an opened loop or closed loop system. Additionally, as discussed below, according to certain embodiments, the second cylinder 224 and the wing flex cylinder 154 can be arranged in a master cylinder and slave cylinder configuration. Alternatively, as shown in FIG. 6B, rather than utilizing the second, or weight distribution, cylinder 224 in a master slave arrangement with the wing flex cylinder 154, according to certain embodiments, the wing flex cylinder 154 can be a first wing flex cylinder 154, and the wing flex assembly 102 can further include a second wing flex cylinder 223 that is hydraulically coupled to the first wing flex cylinder 154 in the master slave arrangement. The second wing flex cylinder 223 can be coupled at a first end 225a to the center frame 112 and at a second end 225b coupled to the inner tube 118, among other portions of the wing frame 114. Similar to the master slave arrangement involving the second cylinder 224 and the wing flex cylinder 154, the first and second wing flex cylinders 154, 223 are hydraulically coupled such that the compression of one of the first and second wing flex cylinders 154, 223 corresponds to the extensions of the other of the first and second wing flex cylinders 154, 223.

According to certain embodiments, a first end 226 of the second cylinder 224 can be pivotally coupled to a main frame flange 230, while a second end 228 of the second cylinder 224 can be pivotally coupled to the wing frame 114. While the second end 228 of the second cylinder 224 can be pivotally coupled to the wing frame 114 at a variety of locations, according to the illustrated embodiment, the second end 228 of the second cylinder 224 is pivotally coupled to a second cylinder flange 232 on the inner tube 118. Additionally, as seen in FIGS. 3, 4, and 6, according to certain embodiments, when the wing frame 114 is not being flexed, and thus is at a neutral position, the wing flex cylinder 154 extends between the first and second ends 156, 158 of the wing flex cylinder 154 in a direction that may, or may not, be generally parallel to the inner and outer tubes 118, 128 and/or generally parallel to the adjacent ground surface. Conversely, the second cylinder 224 can downwardly extend from the center frame 112 from an elevation at the first end 226 of the second cylinder 228 that is higher than the wing flex cylinder 154, to an elevation at the second end 228 of the second cylinder 224 that is at or around the elevation of the wing flex cylinder 154. Accordingly, with the wing frame 114 at the neutral position, as that shown in FIGS. 3, 4, and 6A, the second cylinder 224 can be at an orientation that is non-parallel and non-perpendicular to the wing flex cylinder 154.

Similar to the wing flex cylinder 154, according to certain embodiments, actuation of the second cylinder 224 such that the second cylinder 224 extends either to the fully extended position, fully retracted position, and positions therebetween can occur in a variety of different manners. For example, according to certain embodiments, information provided by the one or more sensors 210 can indicate a degree that the wing frame 114 is being, or has been, flexed in with the upwardly or downwardly direction. Using such information, the controller 202 can issue commands indicating whether the second cylinder 224 is to be activated in either the extended or retracted directions, and if so, the extent or degree of actuation. Further, similar to the wing flex cylinder 154, the controller 202 may generally continuously monitor information from the sensor 210 so as to relatively continuously, if needed, provide commands to adjust the extended/retracted position of the second cylinder 224 as changes, if any, in the profile ground surface are encounter by the implement 100.

Figure 9:
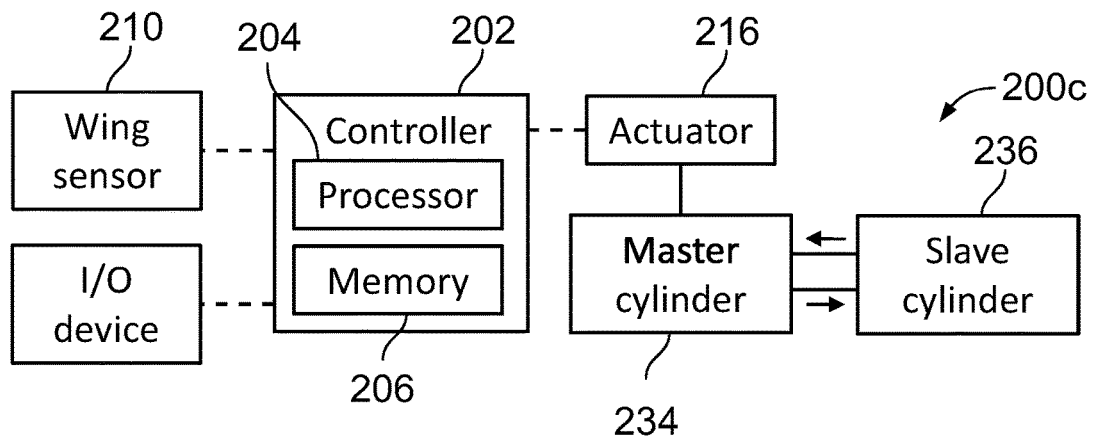

FIG. 9 illustrates another embodiment in which the control system 200c includes a plurality of hydraulic or pneumatic cylinders, such as a master cylinder 234 and a slave cylinder 236, which are hydraulically coupled in a master-slave cylinder arrangement. According to such embodiments, displacement of one of the master cylinder 234 and the slave cylinder 236 to a retracted position can be translated into a fluid pressure, that facilitates displacement of the other of the master cylinder 234 or slave cylinder 236 to an extended position, and thereby resulting in associated displacement of the outer tube 128 relative to at least the inner tube 118. According to certain embodiments, the master cylinder 234 can comprise one of the wing flex cylinder 154 and the second cylinder 224, and the slave cylinder 236 can comprise the other one of the wing flex cylinder 154 and the second cylinder 224, as discussed above. Alternatively, as shown by at least FIG. 6B, according to other embodiments, the wing flex cylinder 154 can be hydraulically coupled in a master slave arrangement with another, or second, wing flex cylinder 223.

For example, according to certain embodiments, the second cylinder 224 can be the master cylinder 234, and the wing flex cylinder 154 can be the slave cylinder 236. In such an arrangement, the second cylinder 224 can be activated via signals generated by the controller 202 in a manner similar to that discussed above with respect to at least FIGS. 3, 4, and 6A. Movement of the second cylinder 224 in either the direction of the extended or retracted position of the second cylinder 224 can facilitate a pressure in the fluid, such as hydraulic fluid, that can be delivered to the wing flex cylinder 154 so as to attain similar actuation and displacement of the wing flex cylinder 154. For example, as the second cylinder 224 is displaced toward the extended position for the second cylinder 224, such movement can be converted to a hydraulic pressure that is communicated to the wing flex cylinder 154 such that the wing flex cylinder 154 is also activated to move toward the extended position of the wing flex cylinder 154, thereby facilitating displacement of the outer tube 128 in a generally outwardly direction toward the extended position of the outer tube 128. Similarly, in such a master-slave cylinder arrangement, as the second cylinder 224 is displaced toward the retracted position of the second cylinder 224, such movement can be converted to a hydraulic pressure that is communicated to the wing flex cylinder 154 such that the wing flex cylinder 154 is also activated to move toward the retracted position of the wing flex cylinder 154, thereby facilitating displacement of the outer tube 128 in a direction generally toward the retracted position of the outer tube 128. The amount of pressure and/or fluid displacement delivered to the wing flex cylinder 154 via the movement of the second cylinder 224 can be calibrated so that, as the second cylinder 224 is activated, the wing flex cylinder 154 causes displacement of the outer tube 128, and the row units 104 attached thereto, to a position that can at least generally maintain the selected spacing between the adjacent row units 104 of the center frame 112 and the wing frame 114, as discussed above.

The foregoing discusses exemplary embodiments in which a component or device of the wing flex assembly 100 is utilized to at least assist in facilitating slideable displacement of the outer tube 128 about the inner tube 118. However, according to other embodiments, the weight of the outer tube 128, either alone or in combination with tools, such as row units 104, mounted or otherwise coupled thereto, can be utilized to facilitate such slideable displacement of the outer tube 128. Further, as seen in FIGS. 11-14, according to certain embodiments, such sliding displacement of the outer tube 128 could be further facilitated by the inclusion of a linkage system 402 with the wing flex assembly 400, as discussed below. According to such an embodiment, the linkage system 402 can be configured such that the kinematics of the linkage system 402 can facilitate the outwardly sliding displacement of the outer tube 128 toward the extended position of the outer tube 128 about or along the inner tube 118. Additionally, such displacement of the outer tube 128 via use of the linkage system 402 may, or may not, be assisted by the weight of, and/or on, the outer tube 128. The extent that the outer tube 128 is displaced toward the extended position, and whether the outer tube 128 reaches the full extended position can depend on a variety of criteria, including, for example, the degree or extent of downward flex of the wing frame 114 and/or the constraints of an associated linkage system 402. Similarly, as the wing frame 114 flexes in the generally upward direction, the kinematics of the linkage system 402, with or without assistance of the weight of, and/or on, the outer tube 128, can be utilized to pull the outer tube 128 toward, and/or to, the retracted position of the outer tube 128 about the inner tube 118. The extent that the outer tube 128 is inwardly displaced toward, and/or to, the retracted position, and whether the outer tube 128 reaches the full extended position, can depend on a variety of criteria, including, for example, the degree or extent of downward flex of the wing frame 114 and/or the constraints of an associated linkage system.

FIGS. 11-14 illustrate an exemplary second embodiment of a wing flex assembly 400 wherein displacement of the outer tube 128 about or along the inner tube 118 of the wing flex assembly 400 is facilitated at least in part by the weight of the outer tube 128 and by the linkage system 402 of the wing flex assembly 400 as the wing frame 114 is pivotally displaced relative to at least the center frame 112. According to such embodiments, the configuration of the outer tube 128 and the inner tube 118 can be similar to that discussed above and illustrated in at least FIGS. 3, 4, and 6A, among other configurations. Further, the manner in which the outer tube 128 slides relative to the inner tube 118 may or may not be at least generally similar to that discussed above with respect to at least FIGS. 5A-5C.

According to certain embodiments, the linkage system 402 can be adapted to provide a six bar mechanism having one degree of freedom, Moreover, according to the illustrated embodiment, the linkage system 402 can include a center link 404 having an upper end 406 and a lower end 408, the upper end 406 being pivotally coupled to an upper link 410, and the lower end 408 being pivotally coupled to a lower link 412. The center link 404 can be pivotally coupled to the center frame 112 at a center link pivot point 414 that is located between the upper and lower ends 406, 408 of the center link 404. According to certain embodiments, the center link 404 can be pivotally coupled to the center frame 112, such as, for example, via a pin, at a location that is generally vertically aligned, but inwardly offset in a horizontal direction from, the pin of the wing pivot point 126, as seen, for example, in FIG. 11. However, the pivot point for the center link 404 can be at a variety of locations on the center frame 112, and can be based at least in part on the design of the linkage system 402. According to certain embodiments, the wing pivot point 126 and the center link pivot point 414 can be, but is not necessarily, aligned along a central longitudinal axis 416 of a center frame base member 418 and/or of the inner tube 118 when the inner tube 118 is at the neutral position, as discussed above. Thus, according to certain embodiments, the center link pivot point 414 can be positioned in closer proximity to the lower end 408, than the upper end 406, of the center link 404.

Figure 11:
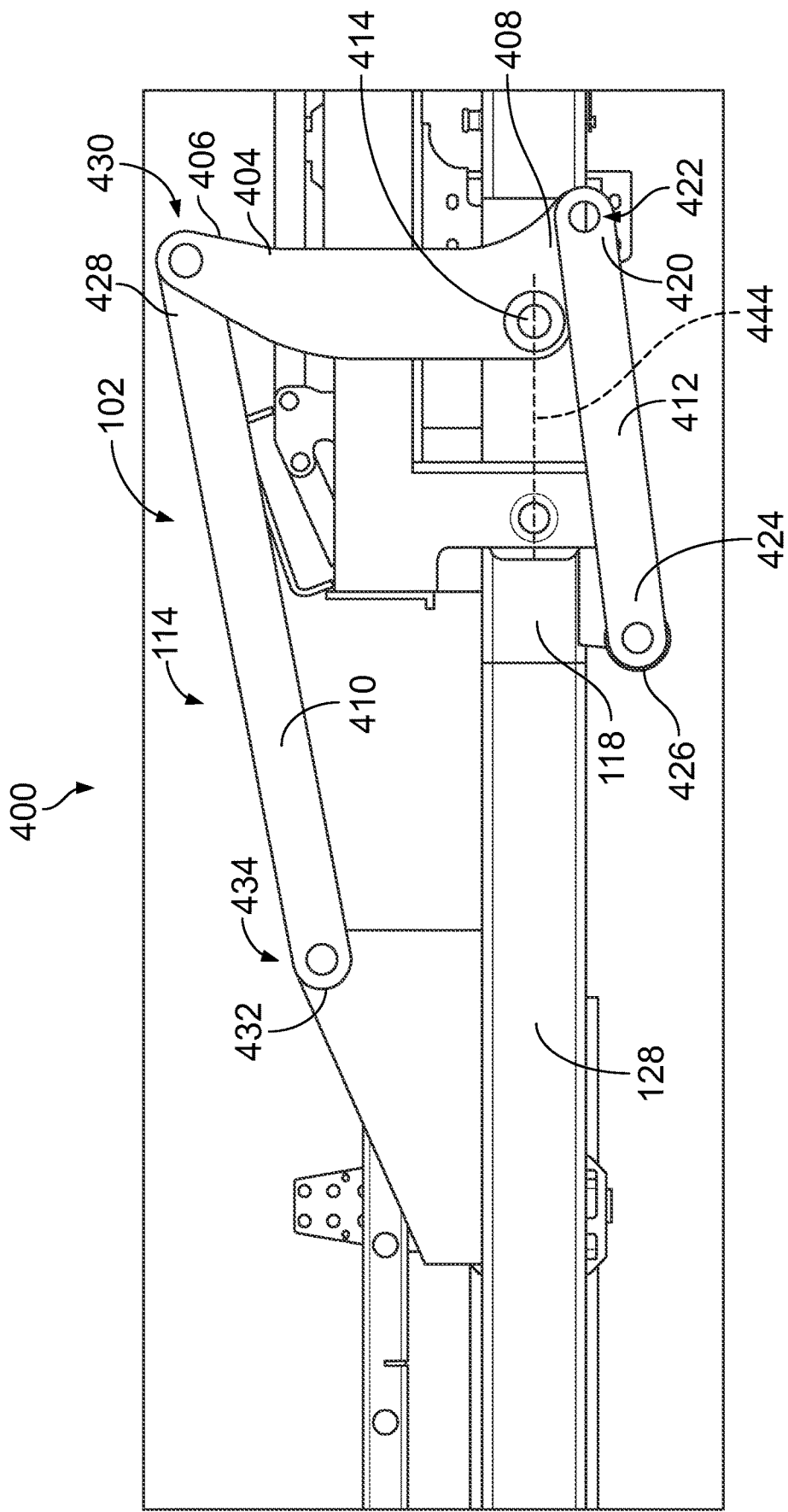
FIGS. 11 and 12 are a partial rear view and a top side perspective view, respectively, of another embodiment of a wing flex assembly in which the wing frame and the wing flex assembly are each at a neutral position at which planting occurs on a relatively flat ground surface.

As seen in at least FIG. 11, a first end 420 of the lower link 412 can be pivotally coupled to the lower end 408 of the center link 404 at a first lower pivot point 422. Further, a second end 424 of the lower link 412 can be pivotally coupled to the wing flex assembly 400, such as, for example, the inner tube 118, at a second lower pivot point 426. Similarly, a first end 428 of the upper link 410 can be pivotally coupled to the upper end 406 of the center link 404 at a first upper pivot point 430, while a second end 432 of the upper link 410 is pivotally coupled to the outer tube 128 at a second upper pivot point 434.

The center link 404 can have a variety of shapes and configurations. For example, referencing FIGS. 11-14, according to certain embodiments, the center link 404 can have a generally dog leg shape. According to such an example embodiment, the lower end 408 of the center link 404 is coupled to the lower link 412 at a location on the center link 404 that, at least when the wing frame 114 is at the neutral position, is inwardly offset relative to the location at which the upper end 406 of the center link 404 is pivotally coupled to the upper link 410. Additionally, according to at least some embodiments, the locations at which the center link 404 is coupled to the upper and lower links 410, 412 can both be, at least when the wing frame 114 is at the neutral position, offset in both horizontal and vertical directions relative to the center link pivot point 414. However, the particular configuration, including whether such an offset is, or is not, present can depend on a variety of factors, including, for example, the length of the links in the link system 402, among other considerations.

Figure 12:
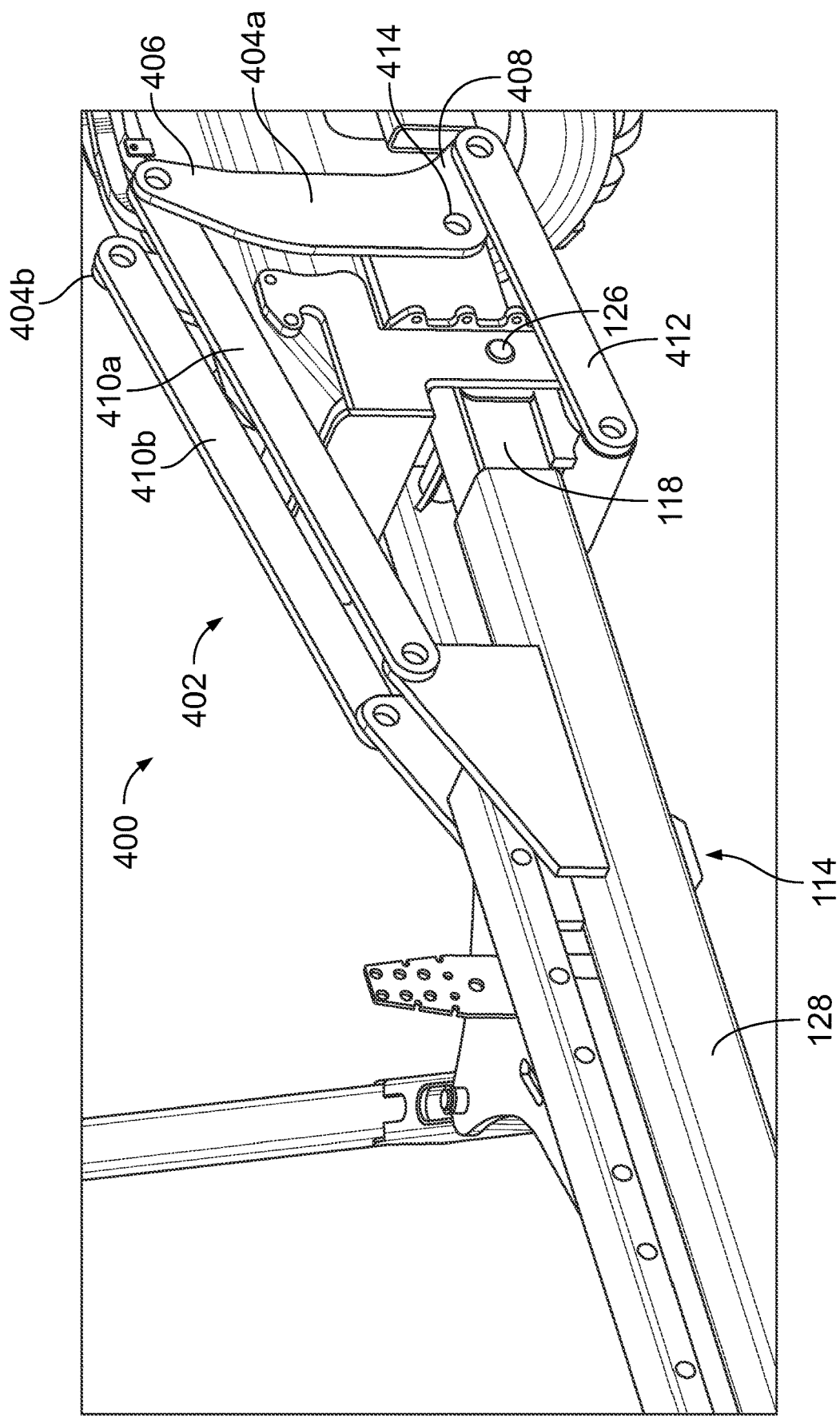
Figure 13:
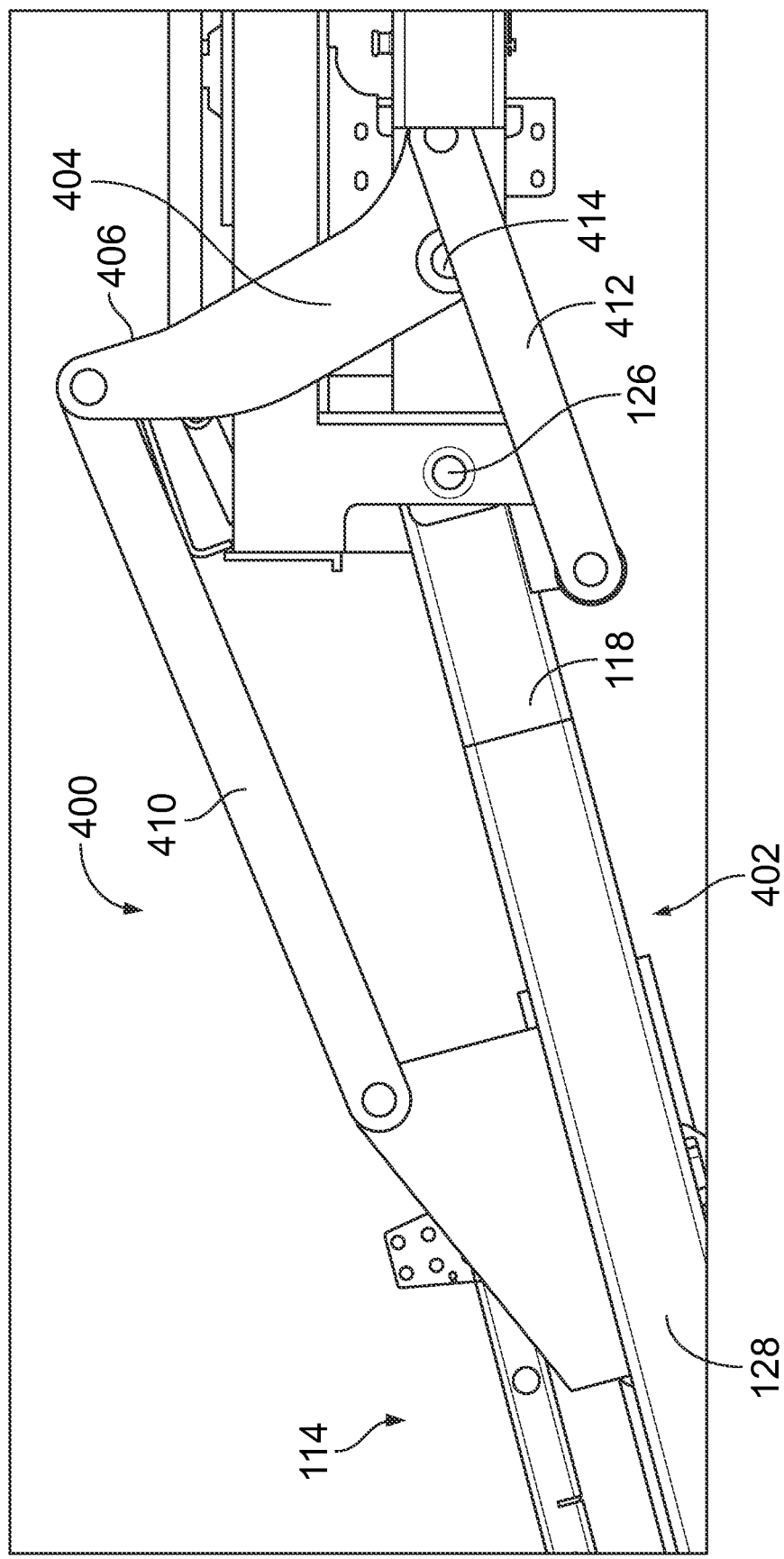
FIGS. 13 and 14 are a partial rear view and a top side perspective view, respectively, of wing flex assembly shown in FIG. 11 in which the wing frame and the wing flex assembly are each at a downward flexed position.
Figure 14:
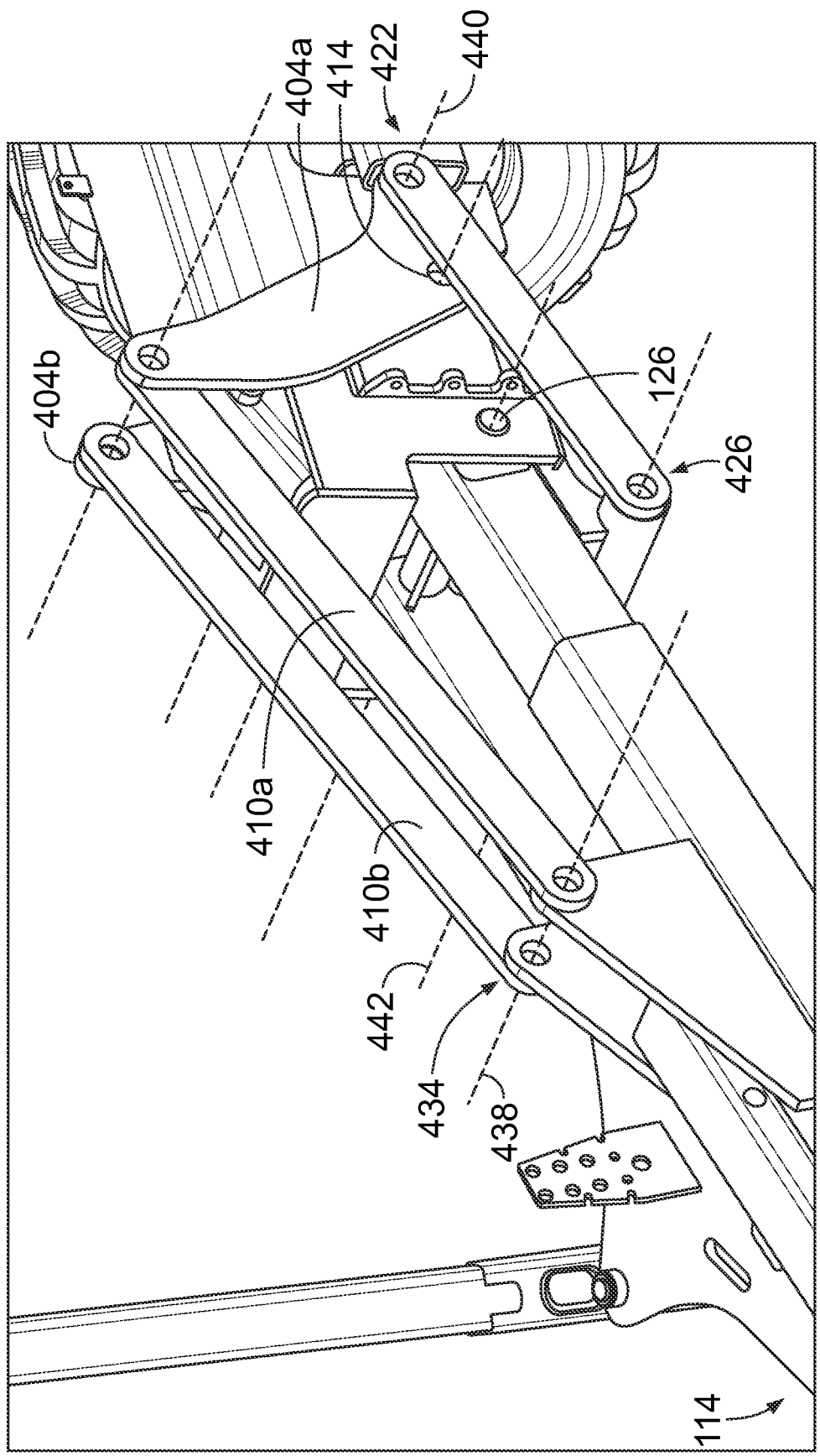

While the side view presented in FIG. 11 displays a single link for each of the links 404, 410, 412 of the linkage system 402, the links 404, 410, 412 can be provided in mating pairs, as is at least partially indicated in FIGS. 12 and 14. As seen, each pair of linkages 404, 410, 412 can have generally the same shapes and configurations, and be pivotally displaced along similar axes as the corresponding linkage 404, 410, 412 in the linkage pair. Thus, for example, the first ends 428 of each pair of upper link 410a, 410b can be each coupled to the upper end 406 of one of a pair of center links 404a, 404b, and be rotatable at the first upper pivot point 430 about a common first upper axis 436 of rotation, as seen in at least FIG. 14. Similarly, the second ends 432 of each pair of upper link 410a, 410b can be each coupled to the outer tube 128, and be rotatable at the second upper pivot point 434 along a common second upper axis 438 of rotation. Although the views in FIGS. 12 and 14 only show one link in the pair of lower links 412, a similar lower link can be included on an opposing side of the inner tube 118 and center frame 112. Thus, according to such an embodiment, a first end 420 of each lower link 412 can be rotatable about a common first lower axis 440 at the first lower pivot point 422, while the second end 424 of the lower link 412 is rotatably displaceable and about a second lower common axis 442 at the second lower pivot point 426.

During operation of the planter 100, in the event the wing frame 114 is downwardly flexed relative to the center frame 112 at the wing pivot point 126, the associated downward movement of the inner tube 118 can result in at least the pivotal displacement of the second end 424 of the lower link 412 in generally downwardly and inwardly directions. For example, referencing the transition from the wing frame 114 being at the neutral position, as shown in FIGS. 11 and 12, to the downwardly flex position shown in FIGS. 13 and 14, the second end 424 of the lower link 412 is rotated by such flexing of the wing frame 114 in a second, counter clockwise direction. Such rotation of the second end 424 is translated to the first end 420 of the lower link 412, thereby resulting in the first end 420 of the lower link 412 also being rotated in the second, counter clockwise direction. As the first end 420 of the lower link 412 is pivotally coupled to the center link 404, the rotation of the first end 420 of the lower link 412 is translated to the lower end 408 of the center link 404, thereby facilitating rotational displacement of the center link 404 about the center link pivot point 414 in the second, counter clockwise direction. As the center link 404 is rotated, the upper end 406 of the center link 404 can provide a force to the upper link 410 that at least partially generally outwardly displaces the upper link 410 that is attached thereto in a direction generally toward the second end 132 of the outer tube 128. Moreover, such a force on the upper link 410 can at least assist in the outwardly sliding displacement of the outer tube 128, to which the second end 432 of the upper link 410 is pivotally coupled, about the inner tube 118 in a direction generally toward the extended position of the outer tube 128. According to certain embodiments, the links 404, 410, 412 of the linkage system 402 can have lengths, configurations, and/or locations of pivot points 414, 422, 426, 430, 434 that translate to the outer tube 128, and the row units 104 and/or other tools that are coupled thereto, being slidingly displaced about the inner tube 118 by a distance that is correlated to the extent and/or degree of flex of the wing frame 114 so as to at least maintain and/or minimize deviations in the spacing between the location seeds are planted by the end row unit 104 of the center frame 112 and the neighboring row unit 104 of the wing frame 114, as previously discussed.

While the above example is discussed with respect to down flexing of the wing frame 114, a similar approach can apply with upward flex of the wing frame 114. However, in such a situation, in response to, and/or during upward flexing, the lower link 412, center link 404, and upper link 410 can each be rotated and/or displaced in a direction, such as, for example, a first clockwise direction, that is opposite to the direction in which the lower link 412, center link 404, and upper link 410 are rotated and/or displaced during downward flex of the wing frame 114. Moreover, the lower link 412, center link 404, and upper link 410 can each be rotated and/or displaced in directions that facilitate the upper link 410 providing a force to the outer tube 128 that can at least assist in the sliding displacement of the outer tube 128 toward, and/or to, the retracted position of the outer tube 128. Additionally, as previously mention, according to certain embodiments, such sliding displacement of the outer tube 128 using the linkage system 402 can be at least partially facilitated by the kinetics of the linkage system 402, and may, or may not, be assisted by the weight of the outer tube 128, including the tools, such as row units 104, that are attached thereto. Additionally, the extent that the outer tube 128 can be moved into proximity to the center frame 112 can again be limited so as to prevent physical contact or other interference between the last row unit 104 of the center frame 112 and the neighboring row unit 104 of the wing frame 114.

FIGS. 15-18 illustrate a third embodiment of an exemplary wing flex assembly 500 that can comprise a front fold pivot structure 502, an inner tube 504, an outer tube 506, one or more position control brackets 508a, 508b, and a draft link bracket 510. The front fold pivot structure 502 can be part of, or otherwise attached to, the center frame 112 or the wing frame 114. According to certain embodiments, the front fold pivot structure 502 includes a housing 512 having a plurality of walls 520a-d that can generally define an opening 514 and an inner area 516 of the housing 512. The opening 514 can provide access to the inner area 516. One or more frame members 518 can be part of the front fold pivot structure 502.

Opposing sidewalls 520a, 520b of the housing 512 can include a first aperture 522 and a second aperture 524. The first aperture 522 in each sidewall 520a, 520b can receive a first pin that pivotally couples the inner tube 504 to the housing 512, while the second aperture 524 in each sidewall 520a, 520b can receive a second pin that pivotally couples the position control bracket 508a, 508b to a sidewall 520a, 520b of the housing 512. The first pin can be a continuous pin that extends through the first apertures 522 on both sidewalls 520a, 520b, or can be multiple different pin segments, with each pin segment only extending through a different one of the first apertures 522 in the sidewalls 520a, 520b. Similarly, the second pin can be continuous pin that extends through the second apertures 524 on both sidewalls 520a, 520b, or can be multiple different pin segments, with each pin segment only extending through a different one of the second apertures 524 in the sidewalls 520a, 520b. Additionally, according to certain embodiments, for each sidewall 520a, 520b, the first and second apertures 522, 524 can be generally aligned with each other such that a central axis 526 that is generally perpendicular to the ground surface can extended through the first and second apertures 522, 524.

Figure 17:
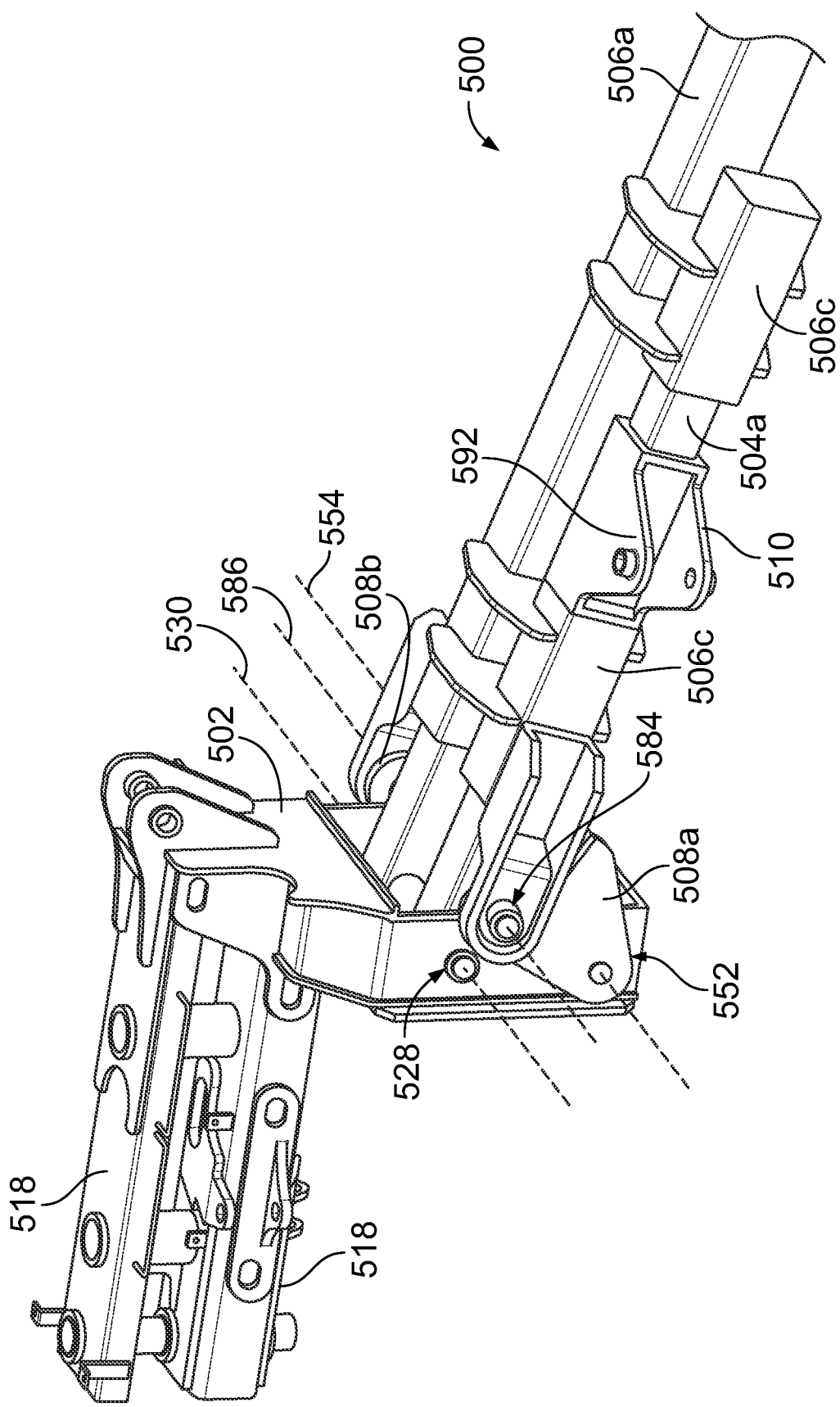
FIG. 17 is a top side perspective view of the wing flex assembly shown in FIG. 15 in a downward flex position.

The inner tube 504 can be pivotally coupled to the front fold pivot structure 502 to accommodate the inner tube 504 being pivotally displaced in generally upward and downward directions relative to the front fold pivot structure 502 in connection with the upward and downward flexing of the wing frame 114. According to certain embodiments, the inner tube 504 can be pivotally coupled to the front fold pivot structure 502 by the one or more pins that is/are received in the first apertures 522 in the sidewalls 520a, 520b of the front fold pivot structure 502 so as to provide a first pivot point 528 (FIG. 17) at which the inner tube 504 can be pivotally displaced along a first axes 530 (FIG. 17). Additionally, according to certain embodiments, the inner tube 504 can be pivotally displaced in an upward direction from a neutral position (FIG. 15), or with respect to the ground, to a downward orientation (FIG. 17) by about 15 degrees, and from the neutral position, or with respect to the ground, to an upward orientation (FIG. 18) by about 15 degrees.

Figure 16:
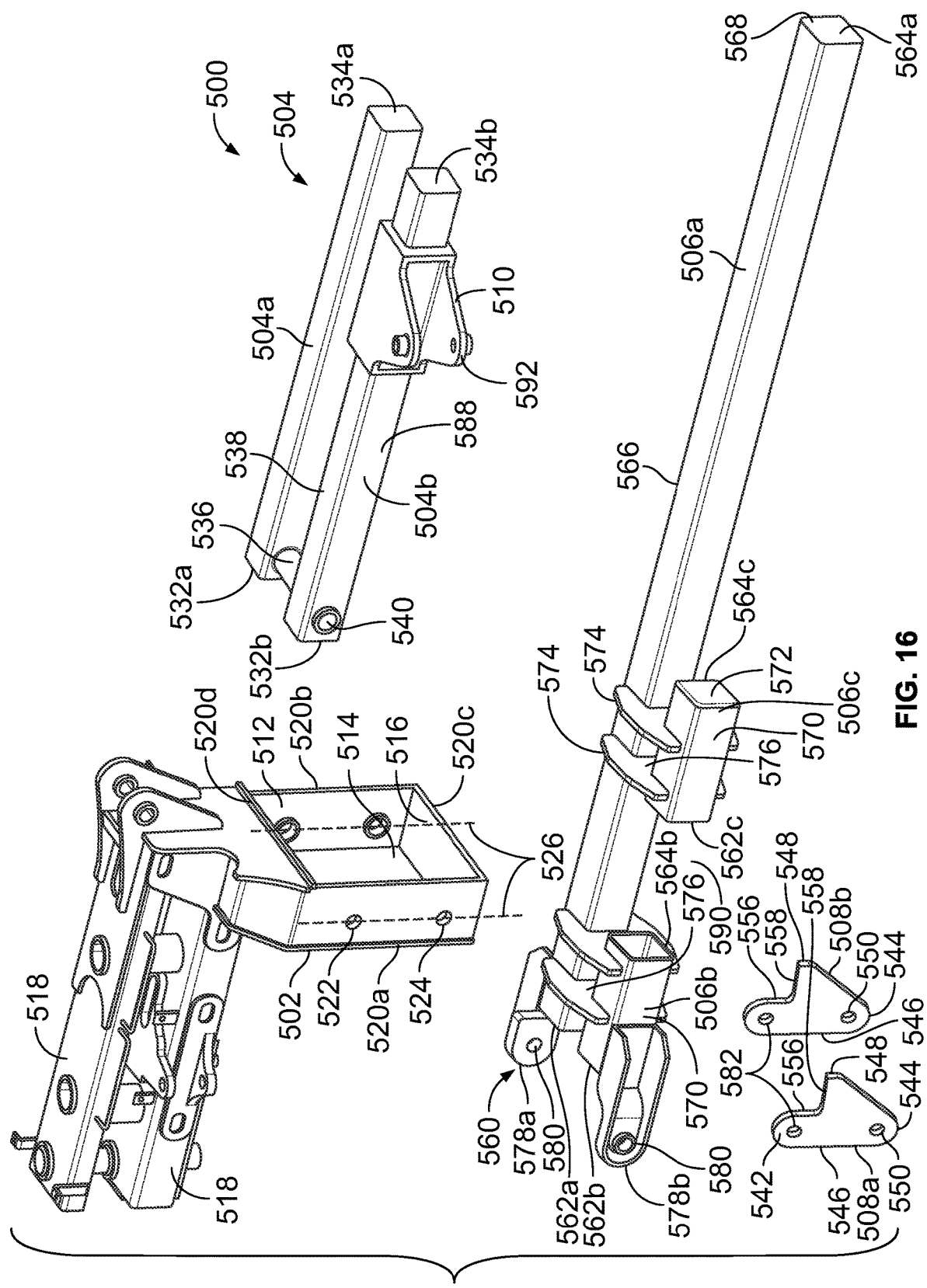
FIG. 16 is an exploded view of the wing flex assembly shown in FIG. 15.

Referencing FIG. 16, the inner tube 504 can comprise a primary inner tube 504a and a secondary inner tube 504b, each having a first end 532a, 532b and a second end 534a, 534b. According to certain embodiments, the primary and secondary inner tubes 504a, 504b can have generally similar shapes, lengths, and/or configurations. For example, according to certain embodiments, the primary and secondary inner tubes 504a, 504b can each have a square, rectangular, or non-circular cross sectional shape, and can have similar lengths between the first end 532a, 532b and the opposing second end 534a, 534b of the primary and secondary inner tubes 504a, 504b. As seen in at least FIG. 16, the primary and secondary inner tubes 504a, 504b can also be generally parallel to, and offset from, each other. Moreover, the primary and secondary inner tubes 504a, 504b can be offset from each other so as to define a passage 538 therebetween. According to certain embodiments, one or more cross bars 536 can extend between, and join, the primary and secondary inner tubes 504a, 504b.

The first end 532a, 532b of each of the primary and secondary inner tubes 504a, 504b can include an aperture 540 that can accommodate placement of the first pin, which can also extend into the mating first aperture(s) 522 in the sidewalls 520a, 520b of the front fold pivot structure 502, as previously discussed. According to the illustrated embodiment, one cross bar 536 can be configured to house and/or encompass at least a portion of the first pin that extends across the passage 538 between the primary and secondary inner tubes 504a, 504b. Additionally, the inner area 516 of the housing 512 of the front fold pivot structure 502 can have a depth from the opening 514 that can accommodate placement, as well as pivotal displacement, of at least the first end 532a, 532b of each of the primary and secondary inner tubes 504a, 504b within the inner area 516.

The position control brackets 508a, 508b can extend vertically between an upper end 542 and a lower end 544, and horizontally between a first side 546 and a second side 548, of the position control brackets 508a, 508b. Each position control bracket 508a, 508b can be pivotally coupled to opposing sidewalls 520a, 520b of the housing 512 of the front fold pivot structure 502. Moreover, each position control bracket 508a, 508b can include a lower aperture 550 that can receive a second pin that can also be received in the second aperture 524 of the adjacent sidewall 520a, 520b of the housing 512 of the front fold pivot structure 502 so as to pivotally couple the position control bracket 508a, 508b to that an adjacent sidewall 520a, 520b. Such coupling of the position control brackets 508a, 508b to the front fold pivot structure 502 can accommodate rotational displacement of the position control brackets 508a, 508b at a second pivot point 552 and about a second pivot axis 554, as seen in FIG. 17. According to the illustrated embodiments, the second pivot axis 554 can be parallel to, and vertically offset from, the first pivot axis 530.

Figure 15:
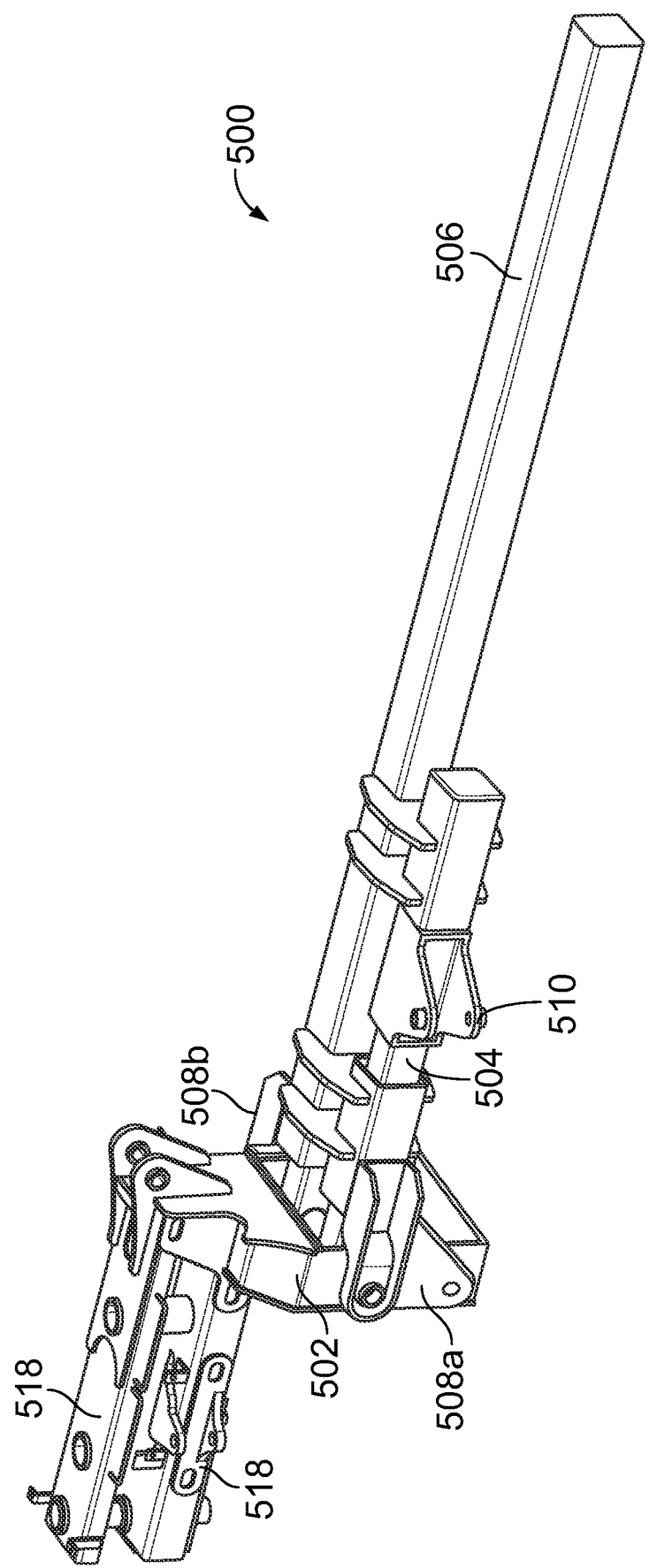
FIG. 15 is a top side perspective view of another embodiment of a wing flex assembly.
Figure 18:
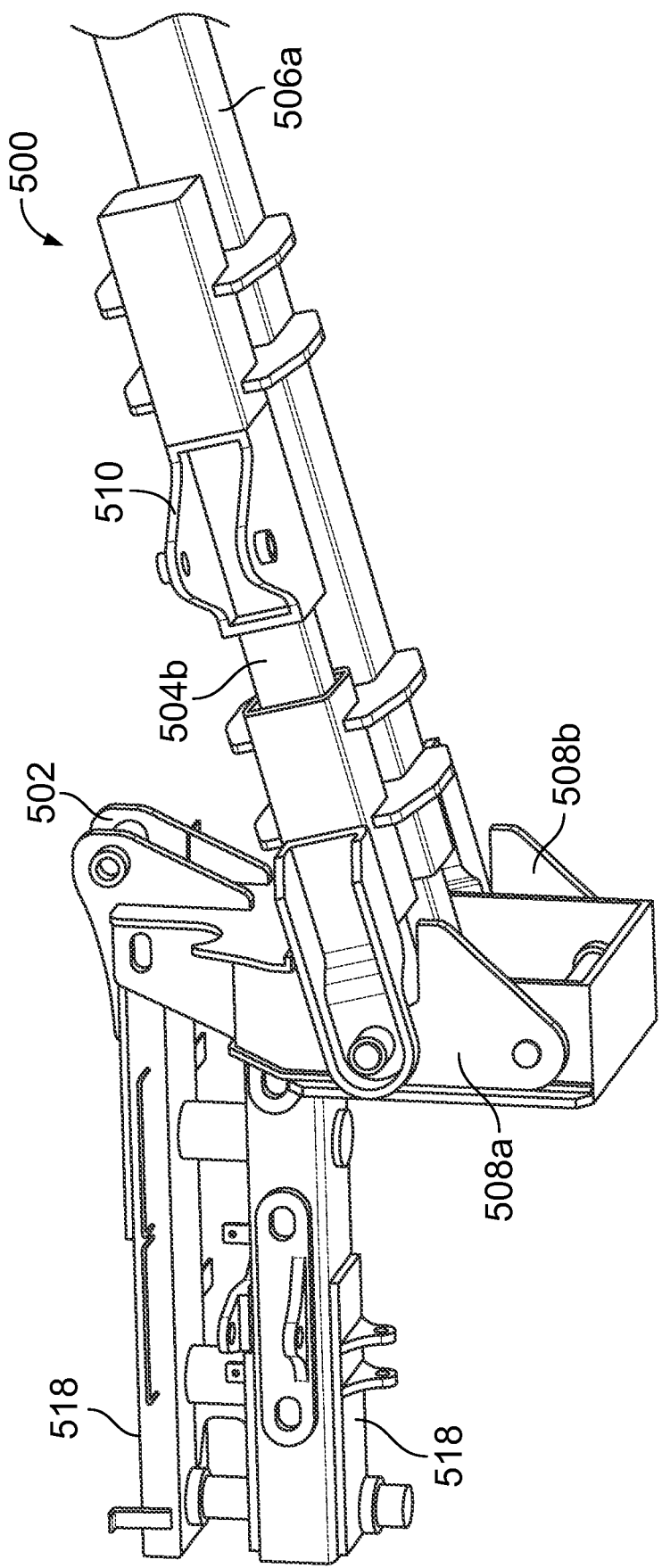
FIG. 18 is a bottom side perspective view of the wing flex assembly shown in FIG. 15 in an upward flex position.

As discussed below, the extent to which the position control bracket 508a, 508b can be rotated can be controlled and/or limited. For example, according to certain embodiments, the position control brackets 508a, 508b can be rotated approximately 30 degrees in a first, clockwise direction from a home position, as seen in FIGS. 15 and 18, to the fully rotated position shown in FIG. 17. However, the extent the position control brackets 508a, 508b can be rotated can be based on the position of the draft link bracket 510, which can act a stopper. Further, according to certain embodiments, when at the home position (FIGS. 15 and 18), the position control brackets 508a, 508b may not be allowed to rotate in a second, counter clockwise direction beyond the home position.

The second side 548 of the position control brackets 508a, 508b can include a first leg 556 and a second leg 558. In the illustrated embodiment, the first leg 556 is generally perpendicular to the second leg 558. Further, according to certain embodiments, the first leg 556 can be positioned relative to the second leg 558 such that the first leg 556 intersects, or is joined to, the second leg 558. The second leg 558 can be a support leg such that abut against, and/or be adjacent to, an adjacent lower portion of the outer tube 506 at least when the position control bracket 508a, 508b is at the home position and the wing flex assembly 500 is at the neutral position (FIG. 15). Further, according to certain embodiments, when the position control brackets 508a, 508b are at their home positions, the second leg 558 can be generally parallel to a flat, horizontal ground surface. Further, according to the illustrated embodiment, as the primary and secondary inner tubes 504a, 504b are pivoted downward in the firsts, clockwise direction as the wing frame 114 is downwardly flexed, the position control brackets 508a, 508b can similar be rotated in the first, clockwise direction from the home position.

According to the illustrated embodiment, the outer tube 506 can include a primary outer tube 506a, one or more secondary outer tubes 506b, 506c, and a pivotal base portion 560. The primary outer tube 506a has a first end 562a and a second end 564a, and is configured for sliding displacement between an extended position and a retracted position about and/or along the primary inner tube 504a. The row units 104 of the wing frame 114, among other tools, can be coupled to the primary outer tube 506a such that the row units 104 are displaced with the displacement of the outer tube 506. As with other embodiments, the displacement of the primary outer tube 506a along and/or about the primary inner tube 504a can occur in a variety of different manners, including via the engagements discussed above with respect to FIG. 5A-5C, among others. Further, the primary outer tube 506a can be configured for a telescopic arrangement with the primary inner tube 504a. Thus, according to the illustrated embodiment, the primary outer tube 506a can include an outer wall 566 that can generally define an inner region 568 that can at least partially, if not entirely, enclose the adjacent portions of the primary inner tube 504a about which the primary outer tube 506a is displaced. According to illustrated embodiments, the outer wall 566 of the primary outer tube 506a can have a square, rectangular, or non-circular cross sectional shape, among others. Thus, for example, the primary outer tube 506a, as well as the secondary outer tube(s) 506b, 506c, and the primary and secondary inner tubes 504a, 504b, can be constructed from hollow square or rectangular bar stock constructed from steel, metal, and/or an alloy material, among other materials commonly used in the construction of frames for planters.

The secondary outer tube(s) 506b, 506c also have a first end 562b, 562c and a second end 564b, 564c, and are configured for sliding displacement about and/or along the secondary inner tube 504b. As seen in at least FIG. 16, the secondary outer tube(s) 506b, 506c can comprise a plurality of tubes or tube segments that each have an outer wall 570 that can generally define an inner region 572 that can receive placement of at least a portion of the secondary outer tube 506b, 506c. Thus, similar to the primary outer tube 506a, the secondary outer tubes 506b, 506c can be configured for a telescopic arrangement about the secondary inner tube 504b. Further, the secondary outer tubes 506b, 506c can each be attached to the primary outer tube 506a by one or more cross members 574 in a manner that separates the secondary outer tubes 506b, 506c from each other by a space 590 while also aligning the secondary outer tubes 506b, 506c with each other. Thus, sliding displacement of the primary outer tube 506a about and/or along the primary inner tube 504a can occur at the same time the secondary outer tubes 506b, 506c are being slidingly displaced about and/or along the secondary inner tube 504b. The secondary outer tubes 506b, 506c are also each positioned to be parallel to, and offset from, the primary outer tube 506a so as to include a gap 576 between each of the secondary outer tubes 506b, 506c and the adjacent primary outer tube 506a. When the outer tube 506 is telescopically positioned about the inner tube 504, the gap 576 between the secondary outer tubes 506b, 506c can generally be at the same location as the passage 538 between the primary and secondary outer tubes 506a, 506b, 506c, as seen for example by at least FIG. 15.

The base portion 560 of the outer tube 506 can be coupled to the first end 562a, 562b of the primary outer tube 506a and a first secondary outer tube 506b. The base portion 560 is configured to pivotally couple the outer tube 506 to the position control brackets 508a, 508b. According to certain embodiments, the base portion 560 has a first pivot bracket 578a that extends from the first end 562a of primary outer tube 506a, and a second pivot bracket 578b that extends from the first end 562b of first secondary outer tube 506b. The first and second pivot brackets 578a, 578b are separated from each other by a distance that can accommodate placement of the housing 512 and the position control brackets 508a, 508b between the first and second pivot brackets 578a, 578b. Moreover, the first pivot bracket 578a can be positioned to be adjacent to an outer side of a first position control bracket 508a, and the second pivot bracket 578b can be positioned to be adjacent to an outer side of the second position control bracket 508b.

The first and second pivot brackets 578a, 578b can each include an aperture 580 that are generally aligned with each other. Such apertures 580 of the first and second pivot brackets 578a, 578b are also positioned to be aligned with an upper aperture 582 in the adjacent first or second position control bracket 508a, 508b. Thus, according to such an embodiment, an upper aperture 582 of the first pivot bracket 578a and the upper aperture 582 of the first position control bracket 508a can receive a pin, and the aperture 582 of the second pivot bracket 578b and the upper aperture 582 of the second position control bracket 508b can receive the same pin or a different pin. Such coupling of the first and second pivotal brackets 578a, 578b to the adjacent position control bracket 508, 508b can accommodate the outer tube 506 being pivotally displaced about the position control brackets 508a, 508b at a third pivot point 584 and along a third pivot axis 586 (FIG. 17).

The draft link bracket 510 can be secured to the outer wall 588 of the secondary inner tube 504b at a position that is in the space 590 that is between the secondary outer tubes 506b, 506c. According to the illustrated embodiment, the draft link bracket 510 can be configured to limit or stop outwardly and inwardly displacement of the outer tube 506. Thus, for example, the draft link bracket 510 can include a projection 592 that outwardly protrudes from the draft link bracket 510 so as to provide an interference against continued sliding displacement of outer tube 506 in both the extended and retracted directions. According to certain embodiments, the draft link bracket 510 can include a partially or entirely enclosed aperture that can accommodate placement of the draft link bracket 510 at and/or about the secondary inner tube 504b. Further, the draft link bracket 510 can be secured to the secondary inner tube 504b in a variety of different manners, including, for example, via one or more mechanical fasteners, such as bolts, screws, and/or pins, and/or via one or more welds, among other manners of securing the draft link bracket 510 to the secondary inner tube 504b. Thus, unlike the outer tube 506, the draft link bracket 510 does not slide along the secondary inner tube 504b, but instead remains at a relatively static position on the secondary inner tube 504b.

According to the illustrated embodiment, as the wing frame 114 is downwardly flexed, the wing flex assembly 500 can be pivotally displaced in a first, clockwise direction from a neutral position, as indicated by FIG. 15, to a downward position, as seen, for example, in FIG. 17. Thus, with such downward flex, the inner tube 504 can be pivoted relative to the front fold pivot structure 502 at the first pivot point 528, and thus along the first pivot axis 530. The downward pivotal displacement of the inner tube 504 can facilitate the downward pivotal displacement of the outer tube 506 that is positioned on and/or about the inner tube 504. Such downward pivotal displacement of the outer tube 506 can provide a force against the position control brackets 508a, 508b that are coupled to the outer tube 506 via the first and second position control brackets 508a 508b. Such a force can pivotally displace the position control brackets 508a, 508b in the first, clockwise direction, and away from the home position that is shown in FIG. 15. Such pivotal displacement can also be accompanied by pivotal displacement of the position control brackets 508a, 508b relative to the outer tube 506 at the third pivot point 584, and along the third pivot axis 586. Moreover, the pivotal displacement of the position control brackets 508a, 508b in the first, clockwise direction, and about the second and/or third pivot points 552, 584 can result in the position control brackets 508a, 508b being rotated in a direction that can provide at least an generally outwardly directed force against the outer tube 506 that can at least assist in displacing the outer tube 506 along or about the inner tube 504 toward the extended position. During such displacement, according to certain embodiments, the first leg 556 of the position control brackets 508a, 508b can contact and/or exert a force against the adjacent first ends 562a, 562b of the primary outer tube 506a and a first secondary outer tube 506b that can assist in the outward displacement of the outer tube 506 about or along the primary inner tube 504a.

The extent that the outer tube 506 can be outwardly displaced to the extended position during such downward flex of the wing frame 104, and thus the wing flex assembly 500, can at least partially be based on the distance the second end 564b of the first secondary outer tube 506b travels before such displacement is stopped by contact between the second end 564b and the draft link bracket 510 and/or the projection 592 of the draft link bracket 510. Thus, in such an embodiment, the outer tube 506 can be deemed to have reached the fully extended position when interference between the first secondary outer tube 506b and the draft link bracket 510 prevents further outwardly displacement of the first secondary outer tube 506b, and thus further displacement of the outer tube 506.

According to such an embodiment, when the wing frame 114 is returned from the downward flex position to the neutral position, the inner tube 504 can be pivotally displaced in a second, counter clockwise direction relative to the front fold pivot structure 502 at the first pivot point 528 and along the first pivot axis 530. The upward pivotal displacement of the inner tube 504 can facilitate the upward pivotal displacement of the outer tube 506 that is positioned on and/or about the inner tube 504. Such upward pivotal displacement of the outer tube 506 can provide a force that also pivotally displaced the position control brackets 508a, 508b at the second pivot point 552, and along the second pivot axis 554, so that the position control brackets 508a, 508b return to their home position. The outer tube 506 can also be pivotally displaces about the third pivot point 584, and along the third pivot axis 586. Such displacement of the position control brackets 508a, 508b can assist in providing a force that can at least assist in inwardly displacing the outer tube 506 along and/or about the inner tube 504 in a direction toward the retracted position of the outer tube 506. However, again the extent that the outer tube 506 can be inwardly slid along or about the inner tube 504 can be limited by the draft link bracket 510 and/or the projection 592 of the draft link bracket 510. Moreover, as the outer tube 506 is slidingly displaced along or about the inner tube 504 toward the retracted position, the first end 562c of the second secondary outer tube 504c can engage the draft link bracket 510 and/or the projection 592 of the draft link bracket 510 in a manner that prohibits further inwardly directed displacement of the outer tube 506. Such a location of the retracted position of the outer tube 506 can correspond to a positon that can prevent physical contact or other interference between the last row unit 104 of the center frame 112 and the neighboring row unit 104 of the wing frame 114.

During upward flex of the wing frame 114, the wing flex assembly 500 can attain an angular orientation shown in FIG. 18. As seen, in such a situation, the inner tube 504 can be pivotally displaced in a second, counter clockwise direction relative to the front fold pivot structure 502, and, moreover at the first pivot point 528 and along the first pivot axis 530. The upward pivotal displacement of the inner tube 504 can facilitate the upward pivotal displacement of the outer tube 506 that is positioned on and/or about the inner tube 504. Such upward pivotal displacement of the outer tube 506 can provide a force that can also accommodate pivotal displacement of the outer tube 506 relative to the position control brackets 508a, 508b at the second pivot point 552, and along the second pivot axis 554. However, as seen in FIG. 18, with the outer tube 506 rotated in an upward direction that is above the neutral position (FIG. 15), the position control brackets 508a, 508b can remain at the home position, as previously discussed. Further, the interference provided by the draft link bracket 510 and/or the projection 592 of the draft link bracket 510 against the first end 562c of the second secondary outer tube 506c can prevent and/or limit sliding displacement of the outer tube 506 about and/or along the inner tube 504 during such upward flex of the wing frame 114.

Figure 19A:
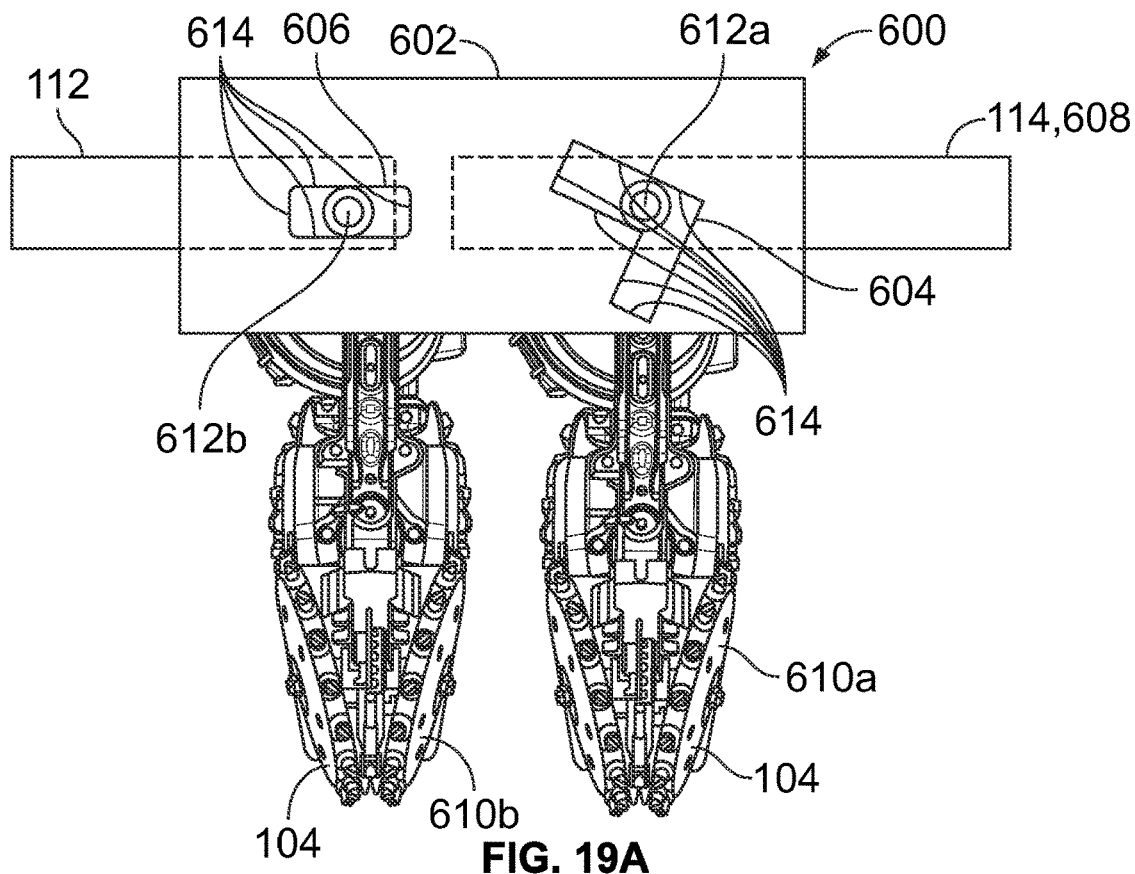
FIGS. 19A-19C are side views of another embodiment of a wing flex assembly with the wing frame at a neutral position, a downward flex position, and an upward flex position, respectively.
Figure 19B:
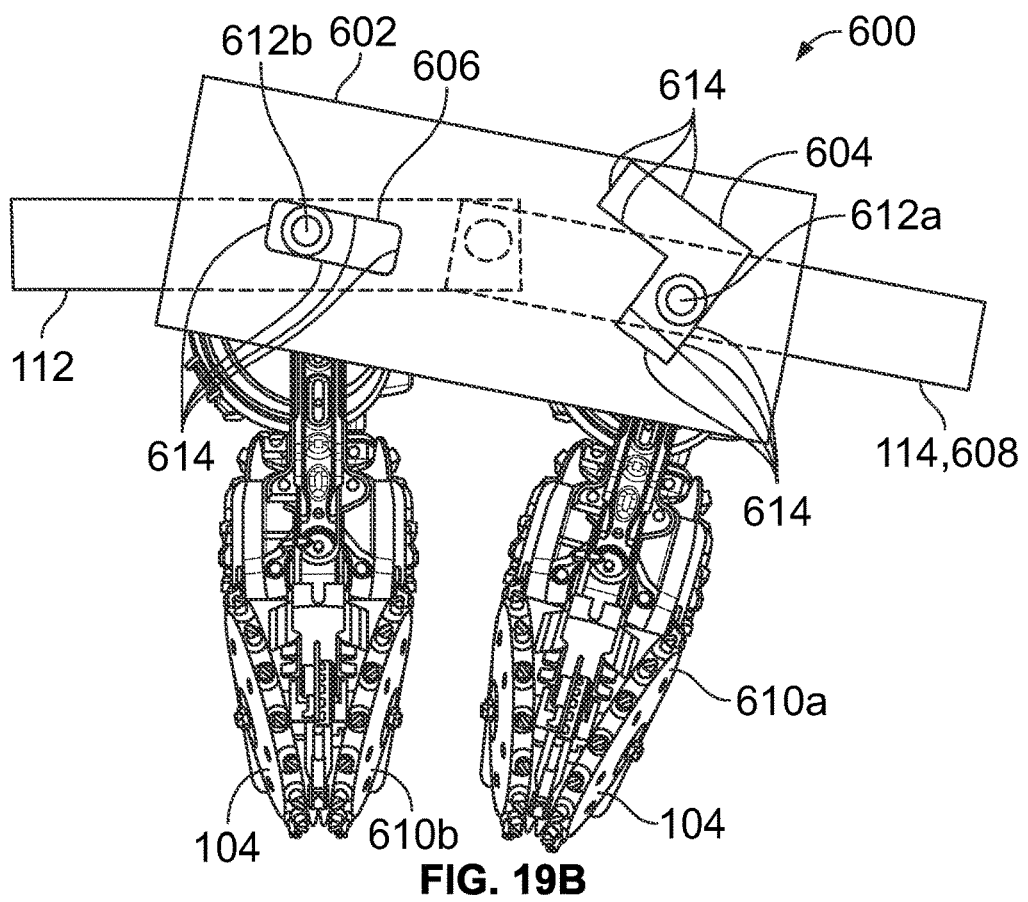
Figure 19C:
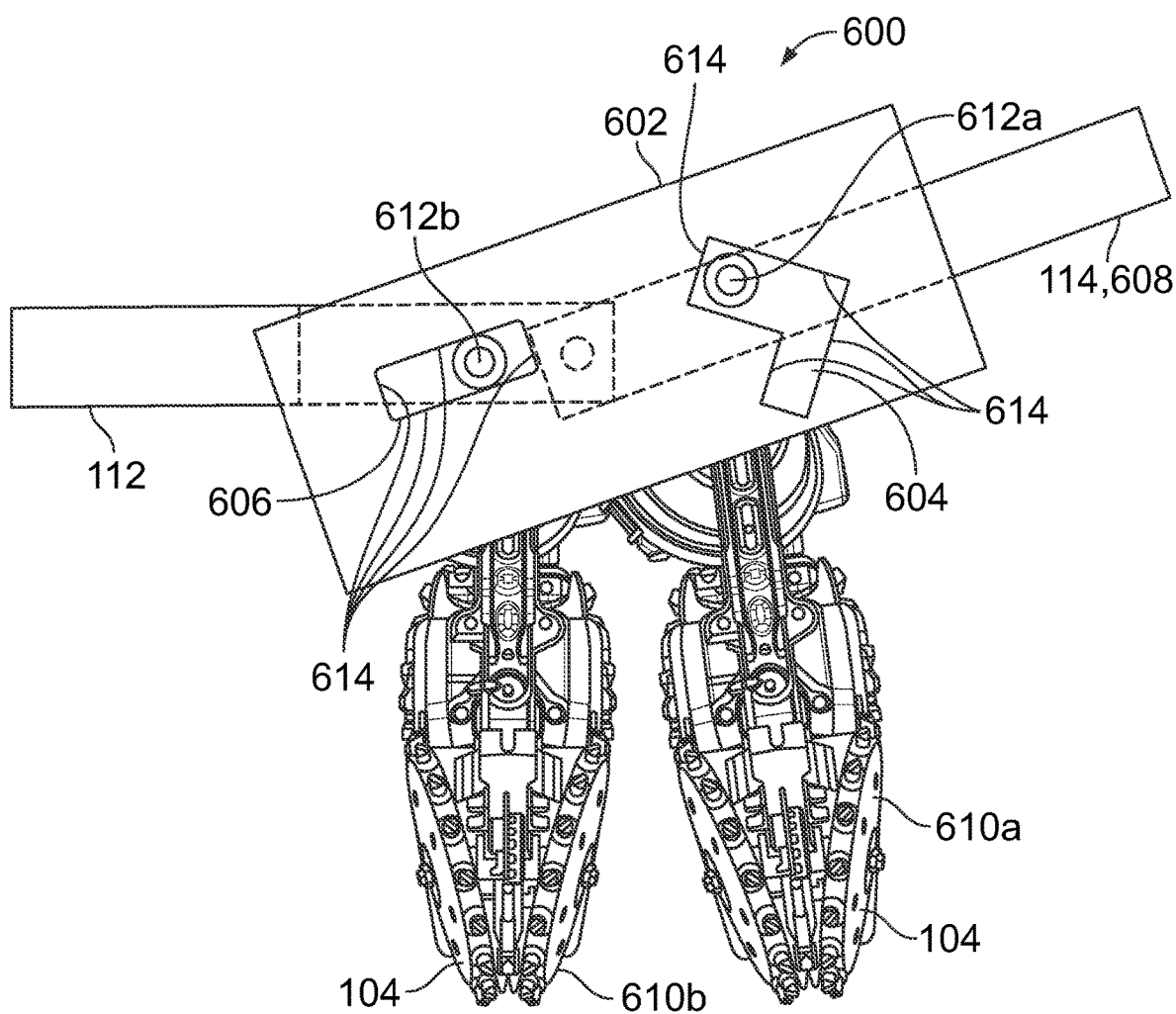

FIGS. 19A-19C illustrate a fourth embodiment of a wing flex assembly 600. According to the illustrated, the wing flex assembly 600 can include a slotted plate 602 having one or more slots 604, 606, such as, for example, a first slot 604 and a second slot 606. The slotted plate 602 can be coupled to the wing frame 114 such that the slotted plate 602 is pivotally displaced with the flexing of the wing frame 114. Thus, for example, in the embodiment shown in FIGS. 19A-C, the slotted plate 602 can be coupled to the tool bar 608 of the wing frame 114.

The first and second slots 604, 606 can be configured to guide displacement of row units 610a, 610b that are coupled to pins 612a, 612b that are each positioned within one of the slots 604, 606. Moreover, changes in at least the angular orientation of the slotted plate 602 as the wing frame 114 flexes can adjust at least an angular orientation of the slots 604, 606. Such changes in the orientations of the slots 604, 606, as well as the weight of the row units 610a, 610b and change in angular orientation of the wing frame 114, can result in the slots 604, 606 providing contact points along which the pins 612a, 612b can be displaced. Thus, the position and/or orientation of the adjacent row units 610a, 610b can be adjusted by the direction and/or orientation that the pins 612a, 612b are displaced via the guided travel of the pins 612a, 612b along the slots 604, 606.

According to the illustrated embodiment, at least one, or a first, row unit 610a that is coupled to the first pin 612a can be coupled and/or move with, the wing frame 114, while the second row unit 610b that is coupled to the second pin 612b can be positioned about and/or coupled to the center frame 112. Thus, in the illustrated embodiment, the first row unit 610a can be the first row unit 610a of the wing frame 114, and the second row unit 610b can be the neighboring or directly adjacent row unit 610b of the center frame 112.

According to such embodiments, the configurations of the first and second slots 604, 606 can be predetermined such that a relationship exists between the extent and direction that the first pin 612a is displaced about the first slot 604, and the extent and direction that the second pin 612b is displaced about the second slot 606. Such guided displacement of the pins 612a, 612b along the slots 604, 606, and the associated positions and angular orientations of the row units 610a, 610b can maintain a selected spacing therebetween so that the seeds planted by the row units 610a, 610b generally remains the same regardless of whether the frame wing 114 is flexed, as well as regardless of the extent or direction of such flex of the wing frame 114. Such configurations of the slots 604, 606 can also be based, at least in part, a correlation between to the degree that the wing frame 114 is flexed and the associated guided displacement of the pins 612a, 612b and row units 610a, 610b so as to still maintain such spacing between the row units 610a, 610b, regardless of the degree of flex of the wing frame 114.

Accordingly, the first slot 604 of the slotted plate 602 can provide a slider joint that can be adapted to guide sliding displacement of a first pin 612a of a row unit 610a of the wing frame 114 at least during upward and downward flexing of the wing frame 114. Moreover, the walls 614 of the first slot 604 can provide contact points that, when in contact with the first pin 612a of the row unit 610a, can guide the sliding displacement of the first pin 612a, and thus the row unit 610a that is coupled to the wing frame 114.

As indicated by a comparison of FIGS. 19A and 19B, as the wing frame 114 is pivotally displaced in a first, clockwise direction, the slotted plate 602 that is attached thereto is also displaced in the first, clockwise direction. Such displacement of at least the slotted plate 602 can facilitate a change in the position and/or orientation of the first slot 604. Thus, for example, with respect to downward flexing of the wing frame 114, the first slot 604 can have a configuration that can facilitate at least outwardly displacement of the first pin 612a, and thus of the row unit 610a, as the row unit 610a also is rotatably displaced in the first, clockwise direction by the downward flex of the wing frame 114. Similarly, as seen in FIG. 19B, during such displacement of the slotted plate 602, the position and/or angular orientation of the second slot 606 can change, which can result in at least a degree of change in the position and/or angular orientation of the second row unit 610b.

Similarly, as indicated by a comparison of FIGS. 19A and 19C, the first slot 604 can have a configuration that can at least guide sliding displacement of the row unit 610a in the second, counter clockwise direction as the row unit 610a is pivotally displaced in the second, counter clockwise direction during upward flexing of the wing frame 114. Similarly, as seen in FIG. 19C, during such displacement of the slotted plate 602, the position and/or angular orientation of the second slot 606 can change, which can result in at least a degree of change in the position and/or angular orientation of the second row unit 610b.

The first and second slots 604, 606 and/or the first and second pins 612a, 612b can be configured to facilitate at least the above-discussed guided movement of the second pin 612b relative to the second slot 606, as well as guided movement of the first slot 604 relative to the first pin 612a. For example, according to certain embodiments, the first pin 612a and/or the second pin 612b can comprise one or more roller bearings. Additionally, the slotted plate 602 can be configured from a variety of different materials that can accommodate such movement and/or wear associated with engagement with the first and second pins 612a, 612b, including, for example, steel, metal, and/or an alloy material, among others.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A frame system of an agricultural implement comprising:
   a center frame coupled to at least a first tool;
   a wing frame coupled to at least a second tool; and
   a wing flex assembly comprising an inner tube and an outer tube, the inner tube being pivotally coupled to the center frame and adapted to be pivotally displaced in at least a downward direction relative to the center frame in response to a downward flex of the wing frame,
   wherein the outer tube comprises a tool bar that is slidingly displaceable along the inner tube at least as the inner tube is pivotally displaced in the downward direction, and
   wherein second tool is coupled to the tool bar of the outer tube and is laterally displaced with the sliding displacement of the tool bar.

2. The frame system of claim 1,
   wherein the inner tube is at least pivotally displaceable from a neutral position to a downward position in response to the downward flex of the wing frame, and
   wherein the outer tube is displaceable from a retracted position to an extended position along the inner tube at least as the inner tube is pivotally displaced in the downward direction.

3. The frame system of claim 2, wherein the first tool is a first row unit, and the second tool is a second row unit, and wherein the first row unit is separated from the second row unit by a first distance when the outer tube is at the retracted position and a second distance when the outer tube is displaced to the extended position, the first distance being about equal to the second distance.

4. The frame system of claim 3, wherein the outer tube is telescopically arranged about the inner tube.

5. The frame system of claim 4, further comprising a roller system positioned within an interior area of the outer tube and coupled to the inner tube and the outer tube, the roller system adapted to accommodate the outer tube being telescopically displaced about the inner tube.

6. The frame system of claim 2, wherein the wing flex assembly comprises a wing flex cylinder that is coupled to the outer tube and adapted to be actuated to provide a force against the outer tube to selectively (1) push the outer tube toward the extended position, and (2) pull the outer tube toward the retracted position.

7. The frame system of claim 6, further including a sensor and an actuator, an angular orientation of the wing frame being detected by the sensor, the actuator adapted to selectively actuate the wing flex cylinder in response to the angular orientation detected by the sensor.

8. The frame system of claim 7, further including a hydraulic valve that is in fluid communication with the wing flex cylinder and adapted to selectively control a delivery of hydraulic fluid to actuate the wing flex cylinder in response to the angular orientation detected by the sensor.

9. The frame system of claim 2, further including an actuator that selectively provides a force to linearly displace the outer tube about the inner tube, a first end of the actuator coupled to one of the inner tube and the outer tube and a second end of the actuator coupled to the other of the inner tube and the outer tube.

10. The frame system of claim 2, wherein the inner tube is at least pivotally displaceable from the neutral position to an upward position in response to an upward flex of the wing frame relative to the center frame, wherein at the upward position, the outer tube is at the retracted position, and the second tool is not in physical contact with the first tool.

11. The frame system of claim 2, wherein the wing flex assembly comprises a linkage system, the linkage system being pivotally coupled to each of the inner tube, the outer tube, and the center frame, the linkage system being adapted to exert a force to linearly displace the outer tube along the inner tube at least in response to the wing frame being flexed in the downward direction.

12. The frame system of claim 11, wherein the linkage system is configured to be actuated by a downward sliding displacement of the outer tube about the inner tube that is facilitated by a weight of the outer tube and the pivotal displacement of the inner tube in the downward direction.

13. A frame system of an agricultural implement comprising:
a center frame coupled to at least a first tool;
a wing frame coupled to at least a second tool; and
a wing flex assembly comprising an inner tube and an outer tube, the inner tube being pivotally coupled to the center frame and adapted to be pivotally displaced in at least a downward direction relative to the center frame in response to a downward flex of the wing frame,
wherein the outer tube is slidingly displaceable along the inner tube at least as the inner tube is pivotally displaced in the downward direction,
wherein second tool is coupled to the outer tube and is laterally displaced with the sliding displacement of the outer tube,
wherein the inner tube is at least pivotally displaceable from a neutral position to a downward position in response to the downward flex of the wing frame,
wherein the outer tube is displaceable from a retracted position to an extended position along the inner tube at least as the inner tube is pivotally displaced in the downward direction,
wherein the wing flex assembly comprises a wing flex cylinder that is coupled to the outer tube and adapted to be actuated to provide a force against the outer tube to selectively (1) push the outer tube toward the extended position, and (2) pull the outer tube toward the retracted position, and
wherein the frame system includes a second cylinder, the second cylinder and the wing flex cylinder are arranged in master-slave cylinder configuration.

14. The frame system of claim 13, wherein the second cylinder is a downward force cylinder that is adapted to provide at least a downward force against at least the wing frame, and wherein actuation of the downward force cylinder facilitates an actuation of the wing flex cylinder.

15. The frame system of claim 13, wherein the second cylinder is a weight distribution cylinder that is adapted to distribute at least a portion of a weight on the center frame to the wing frame, and wherein actuation of the weight distribution cylinder facilitates an actuation of the wing flex cylinder.

16. A frame system of an agricultural implement comprising:
a center frame coupled to at least a first tool;
a wing frame coupled to at least a second tool; and
a wing flex assembly comprising an inner tube and an outer tube, the inner tube being pivotally coupled to the center frame and adapted to be pivotally displaced in at least a downward direction relative to the center frame in response to a downward flex of the wing frame,
wherein the outer tube is slidingly displaceable along the inner tube at least as the inner tube is pivotally displaced in the downward direction,
wherein second tool is coupled to the outer tube and is laterally displaced with the sliding displacement of the outer tube,
wherein the inner tube is at least pivotally displaceable from a neutral position to a downward position in response to the downward flex of the wing frame,
wherein the outer tube is displaceable from a retracted position to an extended position along the inner tube at least as the inner tube is pivotally displaced in the downward direction,
wherein the wing flex assembly comprises a linkage system, the linkage system being pivotally coupled to each of the inner tube, the outer tube, and the center frame, the linkage system being adapted to exert a force to linearly displace the outer tube along the inner tube at least in response to the wing frame being flexed in the downward direction, and
wherein the linkage system includes a center link, a lower link, and an upper link, the center link being pivotally coupled to the center frame, the upper link pivotally coupled to both an upper portion of the center link and the outer tube, the lower link pivotally coupled to both a lower portion of the center link and the inner tube.

17. A frame system of an agricultural implement comprising:
a center frame coupled to at least a first tool;
a wing frame coupled to at least a second tool;
a wing flex assembly comprising an inner tube and an outer tube, the inner tube being pivotally coupled to the center frame and adapted to be pivotally displaced in at least a downward direction relative to the center frame in response to a downward flex of the wing frame; and
a front fold pivot structure and at least one position control bracket, the front fold pivot structure being attached to the center frame, the inner tube being pivotally coupled to the front fold pivot structure to provide a first pivot point, the at least one position control bracket being pivotally coupled to the front fold pivot structure to provide a second pivot point, and the position control bracket further pivotally coupled to the outer tube to provide a third pivot point, wherein the outer tube is slidingly displaceable along the inner tube at least as the inner tube is pivotally displaced in the downward direction, wherein second tool is coupled to the outer tube and is laterally displaced with the sliding displacement of the outer tube, wherein the inner tube is at least pivotally displaceable from a neutral position to a downward position in response to the downward flex of the wing frame, wherein the outer tube is displaceable from a retracted position to an extended position along the inner tube at least as the inner tube is pivotally displaced in the downward direction.

18. The frame system of claim 17, wherein the outer tube comprises a primary outer tube, a first secondary outer tube, and a second secondary tube, the inner tube comprising a primary inner tube and a secondary inner tube, the primary outer tube being slideably displaceable along the primary inner tube, the first and second secondary outer tubes being slidingly displaceable along the secondary inner tube, the first and second secondary outer tubes being separated from each other by a space.

19. The frame system of claim 18, further comprising a draft link bracket secured to the secondary inner tube, at least a portion of the draft link bracket extends into a portion of the space between the first and second secondary outer tubes.

20. The frame system of claim 19, wherein the draft link bracket includes a protrusion positioned to contact the first secondary outer tube as the outer tube is slidingly displaced to a fully extended position along the inner tube, and wherein the protrusion is positioned to contacted the second secondary outer tube when the outer tube is slidingly displaced to a fully retracted position along the inner tube.

* * * * *